United States Patent [19]
Howland et al.

[11] Patent Number: 5,826,749
[45] Date of Patent: Oct. 27, 1998

[54] MULTIPLEXED SYSTEM FOR DISPENSING MULTIPLE CHEMICALS TO MULTIPLE DESTINATIONS

[75] Inventors: David R. Howland, Aptos; Stephen G. Hosking; Henry W. Cassady, both of Santa Cruz, all of Calif.

[73] Assignee: Nova Controls, Santa Cruz, Calif.

[21] Appl. No.: 605,561

[22] Filed: Feb. 22, 1996

[51] Int. Cl.⁶ .................................... B67B 7/00
[52] U.S. Cl. ......................... 222/1; 222/57; 222/144.5; 137/93
[58] Field of Search .................. 222/57, 1, 23, 222/145.6, 145.7, 144.5; 137/88, 92, 93; 251/7

[56] References Cited

U.S. PATENT DOCUMENTS

| | | | |
|---|---|---|---|
| 4,733,798 | 3/1988 | Brady et al. | 222/23 |
| 4,858,449 | 8/1989 | Lehn | 68/12 R |
| 4,964,185 | 10/1990 | Lehn | 8/158 |
| 5,014,211 | 5/1991 | Turner et al. | 364/478 |
| 5,129,549 | 7/1992 | Austin | 222/129.1 |
| 5,203,366 | 4/1993 | Czeck et al. | 137/3 |
| 5,246,026 | 9/1993 | Proudman | 137/3 |

FOREIGN PATENT DOCUMENTS

| | | | |
|---|---|---|---|
| 0 032 472 | 7/1981 | European Pat. Off. | F15C 7/00 |
| 2 111 946 | 7/1983 | United Kingdom | G01F 11/30 |

*Primary Examiner*—Gregory L. Huson
*Attorney, Agent, or Firm*—Townsend and Townsend and Crew LLP

[57] ABSTRACT

The present invention relates to dispensing chemicals from a multiplexed group of chemicals and delivering the chemicals to a multiplexed set of industrial washers. An input multiplexer operatively couples a selected system input tube to a chemical pump, thereby permitting a selected liquid chemical to be pumped from a chemical container through the chemical delivery system to a selected washer.

48 Claims, 18 Drawing Sheets

MULTIPLEXED SYSTEM FOR DISPENSING MULTIPLE CHEMICALS TO MULTIPLE DESTINATIONS

BACKGROUND OF THE INVENTION

The present invention relates to an improved method and system for dispensing chemicals. More particularly, the present invention relates to dispensing chemicals from a multiplexed group of chemicals and delivering the chemicals to a multiplexed set of industrial washers.

Current chemical delivery systems suffer from a variety of problems, generally stemming from the cost building and maintain the system. Presently, chemical dispensing systems are burdened with an excessive number of components and decentralized location of the components. In a typical system, different chemicals are individually stored in large, industrial-sized drums, which can be as large as 55 gallons to 2,000 gallons. Undiluted chemicals are typically used because they are less expensive to transport from the chemical manufacturer to the user of the chemicals. Using undiluted chemicals, however, requires that the dispensing system perform this dilution function. Therefore, the dispensing systems often have a water reservoir from which water may also be pumped. The water pumped from this reservoir is combined with the chemical pumped from the storage drum to dilute the chemical. The diluted chemical solution is then pumped to the appropriate destination.

The caustic properties of the chemicals involved create problems which must be solved by any dispensing system employing such chemicals. One problem is that the caustic nature of the chemicals corrodes and eventually ruins the tubing and the pumps of the dispensing system.

Furthermore, in order to maintain the quality of the dispensing system, the flow rate of the chemical must be accurately controlled to prevent dispensing a chemical solution that is too highly concentrated with a caustic chemical which may ruin the products that the chemical solution contacts (for example, clothes). Prior art systems address this problem by regulating the amount of time that each chemical is pumped in the system. This method fails to accurately measure the amount of chemical that is pumped at any given time. The amount of chemical dispensed is determined by the rate of flow of the chemical in the pump multiplied by the amount of time that the pump is activated. Obvious problems with this method exist. For example, the pump may not pump a constant amount of chemical. Also, there may be a lag time between the time a pump is started and the time at which the pump reaches its maximum flow rate. A possible solution to this problem is to place a flow meter in the line of the chemical pump, but the flow meter likely will become corroded by the caustic nature of the chemicals. Frequent replacement of these ruined flow meters adds to the cost of the system.

Another drawback to current chemical dispensing systems is the decentralized location of the chemical storing drums and of the final destinations of the chemical solutions caused by the sheer volume of chemicals involved and the size of the machines at the output of a dispensing system that use the chemicals dispensed. For example, if the system is used for supplying chemicals to an industrial clothes washing facility, the chemical drums may need to store approximately 55 gallons. Each container would therefore be approximately 2'×3' in size. Moreover, each washer at the output of the dispensing system may occupy 100 sq. ft. Chemical drums and washing machines of this size often cannot be stored in a single room. This decentralization of the system increases the time required to locate and fix any problems in the system. Increased maintenance time will in turn increase the cost of the dispensing system over its useful life.

Therefore, a need exists for an improved method and system for dispensing multiple chemicals to multiple destinations.

SUMMARY OF THE INVENTION

The present invention is directed to a liquid chemical delivery system for use with a plurality of liquid chemical containers. The system includes in a preferred embodiment a chemical pump for pumping liquid chemicals, a plurality of system input tubes and an input multiplexer that couples the plurality of system input tubes to the chemical pump. The input multiplexer operatively couples a selected system input tube to the chemical pump, thereby permitting a selected liquid chemical to be pumped from a chemical container through the chemical delivery system. A water supply is also coupled to the deliver system. A transport pump receives water from the water supply and the selected chemical from the chemical pump and combines the two to form a solution of the selected chemical and the water. The liquid chemical dispensing system further includes an output multiplexer that couples the transport pump to a plurality of system output tubes for delivery to at least one chemical receptacle, such as, for example, an industrial clothes washer.

DESCRIPTION OF THE PREFERRED EMBODIMENT

The present invention provides an efficient method and system of dispensing chemicals.

Reducing the number of parts, especially the number of pumps, required in a chemical dispensing system will reduce the cost both of acquisition and maintenance of the dispensing system. The cost of chemical pumps for chemical dispensing systems tends to be especially high in relation to other parts of the system. Therefore, it is desirable to reduce the number of pumps in a dispensing system. Reducing the number of pumps will not only lower the initial cost of the system, but will also reduce the cost of maintaining the system because there are fewer chemical pumps to repair or replace. Moreover, reducing the number of chemical pumps can centralize the dispensing system maintenance. As noted above, the size of the systems in question is often quite large. Fewer chemical pumps translates to fewer pump locations and lower maintenance costs. These cost reductions take on greater importance with the chemicals involved in the dispensing system are caustic, thereby causing the parts within the system to corrode. The present invention helps to reduce the concerns and costs associated with corrosive chemical dispensing systems. In a preferred embodiment of the present invention, a method and apparatus are provided for reducing the number of chemical pumps necessary to a single pump by multiplexing a plurality of system inputs to a single chemical pump.

Moreover, end users of chemical dispensing systems, especially ones employing caustic chemicals, require higher quality control over the amount of chemical dispensed. A preferred embodiment of the present invention provides a method and apparatus for precisely monitoring and controlling the amount of chemical dispensed by the system.

Figure 1:
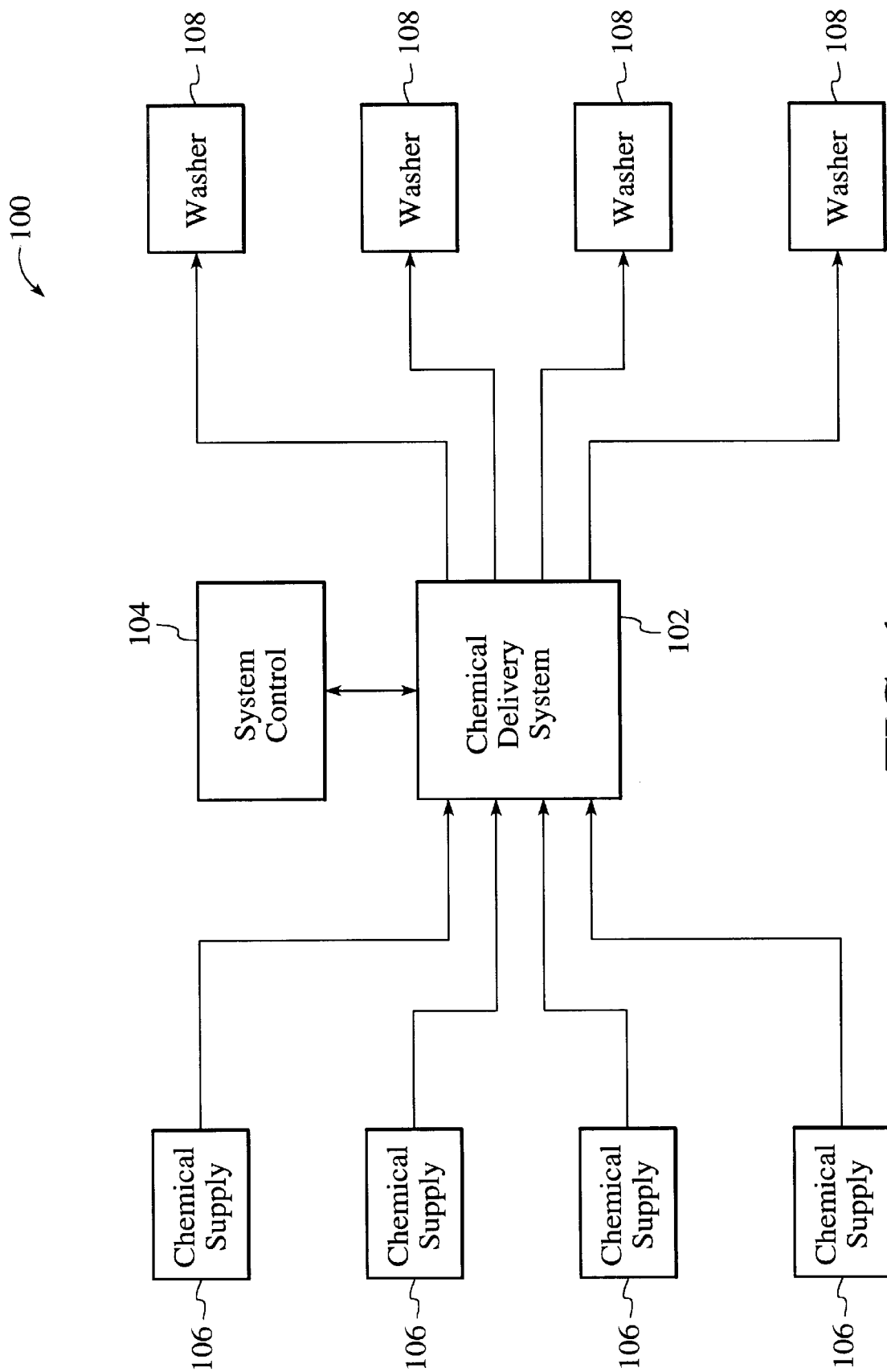
FIG. 1 shows a simplified block diagram of an industrial clothes washing system including a chemical delivery system according to the present invention.

FIG. 1 shows a simplified block diagram of an industrial clothes washing system 100 including a chemical delivery system 102 according to the present invention. Chemical delivery system 102 is under control of system control block 104. System control block 104 may be, merely by way of example, a microprocessor-based control system. Chemical delivery system 102 receives chemicals from a plurality of chemical supply containers 106. In a preferred embodiment, each chemical supply container 106 includes a different chemical used for a different stage of the washing cycle. These chemicals may include, for example, detergent, fabric softener, or bleach. Chemical delivery system 102 outputs a selected chemical to one of a plurality of industrial clothes washers 108. Washers 108 may be of the type used in, for example, hotels or hospitals. In operation, chemical delivery system 102, under the control of system control block 104, receives a chemical from a selected chemical supply container 106 and delivers the selected chemical to a selected washer 108. The structure and operation of chemical delivery system 102 will be described herein.

Figure 2:
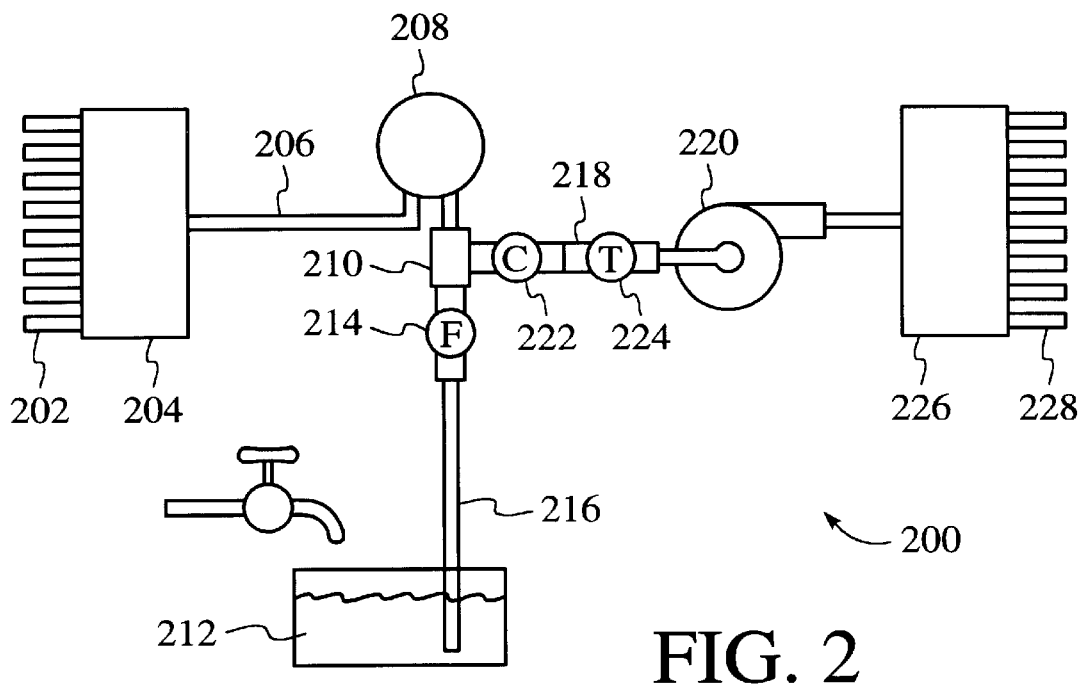
FIG. 2 shows a preferred embodiment of a chemical delivery system according to the present invention.

FIG. 2 shows a preferred embodiment 200 of a chemical delivery system shown in FIG. 1. A plurality of system input tubes 202 are coupled at one end to a plurality of chemical supplies (not shown) and at a second end to an input multiplexer 204. The input multiplexer 104 mechanically couples the plurality of system input tubes 202 to a single chemical flow tube 206.

The flow of chemical from the system input tubes 202 to the chemical flow tube 206 is normally restricted. However, when a desired system input tube 202 is selected, the input multiplexer 204 enables the flow of a selected chemical through a selected system input tube 202 to the chemical flow tube 206. The step of enabling flow from the selected system input tube 202 to the chemical flow tube 206 is referred to as "operatively coupling" the selected system input tube 202 to the chemical flow tube 206. The chemical flow tube 206 couples the input multiplexer 204 to a reversible chemical pump 208. Therefore, the flow enablement of the input multiplexer 204 may also be referred to as operatively coupling the system input tube 202 to the chemical pump 208. Chemical pump 208 is then coupled to a mixer 210 via chemical flow tube 206. It should be understood that alternate means other than a pump could be used for transporting the chemical, such as a pressurized vessel, venturic methods or gravity.

Water supply 212 is coupled to a water flow meter 214 via a water flow tube 216. Water flow tube 216 further couples water flow meter 214 to the mixer 210. Solution flow tube 218 couples the mixer 210 to a transport pump 220. Disposed in series along the solution flow tube 218 are a solution conductivity cell 222 and a solution temperature cell 224.

Transport pump 220 is designed to pump a solution of chemical and water, or a volume of water only. The transport pump 220 must also have sufficient power to pump a combination of water and a high viscosity chemical solution. Solution flow tube 218 further couples an output of the transport pump 220 to an output multiplexer 226.

According to a preferred aspect of the present invention, the output multiplexer 226 is a multiplexer similar to input multiplexer 204. In this embodiment, the, output multiplexer restricts a flow from the solution flow tube 218 to a plurality of system output tubes 228 unless a particular system output tube 228 is selected. The output multiplexer couples the solution flow tube 218 to a plurality of system output tubes 228. The output multiplexer enables the flow of a chemical solution from the transport pump 220 to a selected system output tube 228. Therefore, the output multiplexer 226 operatively couples the transport pump 220 to a selected system output tube 228. The system output tubes 228 are in turn coupled to a plurality of receptacles adapted to receive a solution of water and chemicals. These receptacles could be, by way of example, industrial washers.

In operation, the chemical dispensing system 200 mixes water with a chemical pumped from a selected system input tube 202 to a selected system output tube 228. To accomplish this, the input multiplexer 204 is set to operatively couple the chemical flow tube 206 to a selected system input tube 202. After chemical and water have been mixed, the output multiplexer operatively couples the solution flow tube 218 to a selected system output tube 228. The system is initialized by starting transport pump 220, which draws water from the water supply 212 and pumps it all the way through the selected system output tube 228. While the transport pump 220 is pumping the water, flow meter 214 verifies adequate water flow through water flow tube 216 and conductivity cell 222 measures a background conductivity of the water. If needed, temperature cell 224 measures the temperature of the water flowing through solution flow tube 218. Once an adequate supply of water is verified by the water flow meter 214, the chemical pump 208 is started. The chemical pump 208 draws a chemical from the selected system input tube 202 through the system and to the mixer 210. The chemical combines with the water in the mixer 210, thereby forming a solution of chemical diluted by the water. This diluted chemical solution is then pumped by the transport pump 220 through the selected system output tube 228. The transport pump 220 has a fixed flow rate. Therefore, when the chemical displaces some of the water previously pumped through the transport pump 220, the chemical pump 208 flow rate is determined from the difference of the reading of the water flow meter 214 before and after the starting of the chemical pump 208. The flow rate of the chemical pump 208 as determined via this method is then used to control the operating time of chemical pump 208. Furthermore, because most of the chemicals involved are highly conductive, comparing a reading of the solution conductivity cell 222 before and after starting the chemical pump 208, the chemical pump 208 provides a "proof of flow" of the desired chemical through solution flow tube 218. Erratic flow meter readings may be used as an indication that problems exist in the system. For example, air in the system caused by an empty chemical source, a leak or insufficient water supply will cause the flow meter readings to become erratic.

After the chemical pump 208 is stopped, the chemical dispensing system 200 cleanses the portions of the system through which a chemical flowed. The transport pump 220 continues to draw water from the water supply 212 until substantially all of the chemical pumped via chemical pump 208 is cleansed from the portion of the chemical dispensing system 200 extending from the mixer 210 through the selected system output tube 228. Also, the chemical pump 208 is reversed to pump water through the mixer 210, the chemical pump 208, the chemical flow tube 206, the input multiplexer 204, and into the selected system input tube 202. Water is pumped through these elements of the system long enough to cleanse these elements of the chemicals, but not long enough to inject the water back into the container from which the chemical came. This cleansing process leaves nothing but water in the system, and almost all chemical residue is eliminated. It should be noted that solution conductivity cell 222 and solution temperature 224 are optional in this embodiment of the chemical dispensing system 200.

FIGS. 3 through 9 illustrate additional embodiments of the present invention. Where appropriate, element numbers from FIG. 2 are used to identify the same elements in FIGS. 3 through 9.

Figure 3:
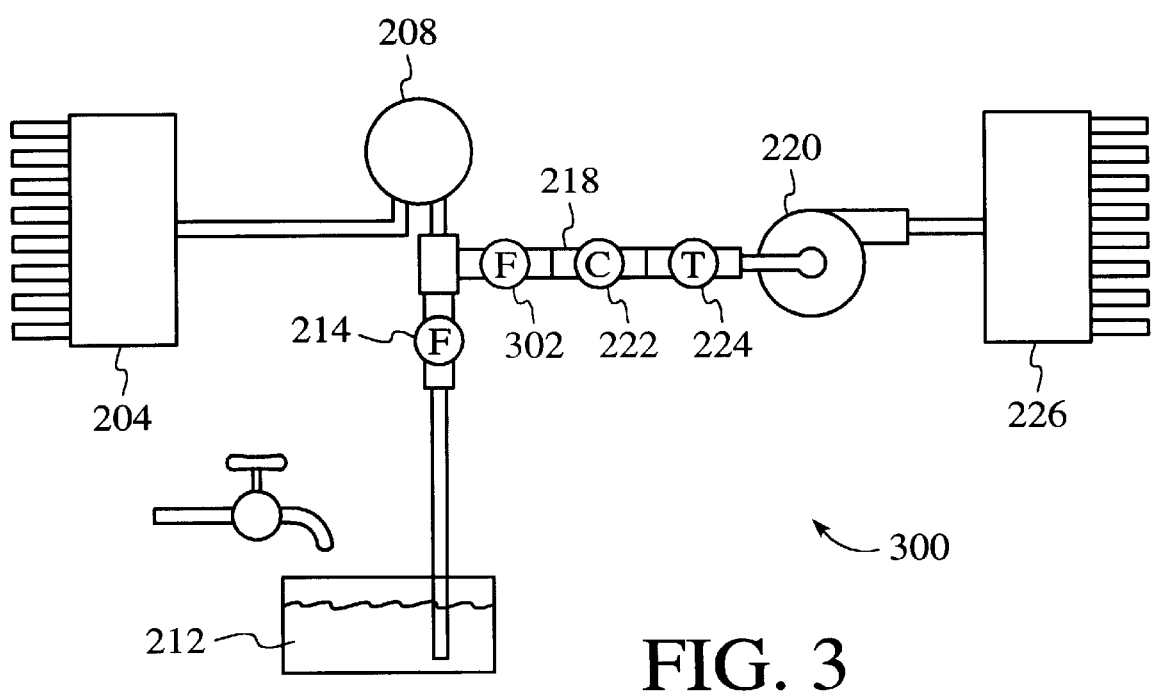
FIGS. 3–9 show alternative embodiments of a chemical delivery system according to the present invention.

FIG. 3 illustrates another embodiment 300 of the present invention. In this embodiment, a solution flow meter 302 is inserted in series into the solution flow tube 218. Under this embodiment, the pumping procedure is the same as that described with reference to FIG. 2. The chemical flow rate of the chemical pump 208 is the instantaneous difference between solution flow meter 302 and water flow meter 214. Therefore, this embodiment has the advantage that a transport pump 220 having a variable or unsteady flow rate may be used. Again, as in FIG. 2, solution conductivity cell 222 and solution temperature cell 224 are optional.

Figure 4:
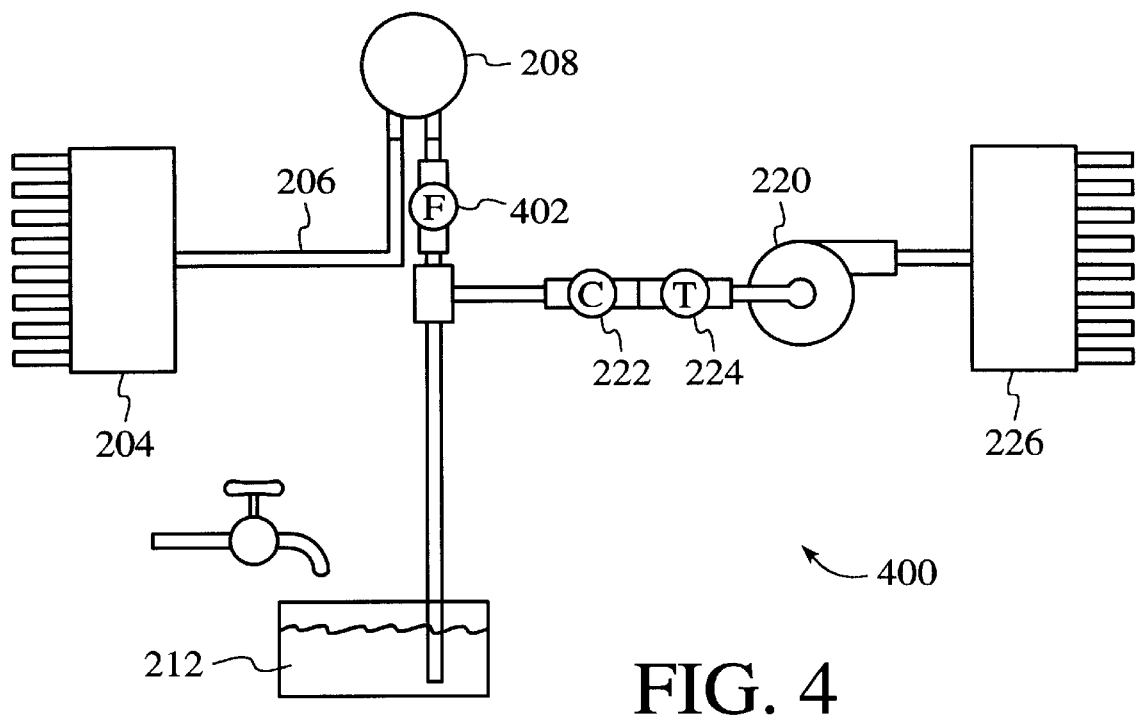

FIG. 4 illustrates an embodiment 400 of the present invention having a chemical flow meter 402 disposed in series in the chemical flow tube 206. In this embodiment, the flow rate of the chemical pump 208 is read directly from chemical flow meter 402. Using this configuration, as with using the configuration in FIG. 3, a transport pump 220 having a variable or unsteady flow rate may be used. Again, solution conductivity cell 222 and solution temperature cell 224 are optional.

Figure 5:
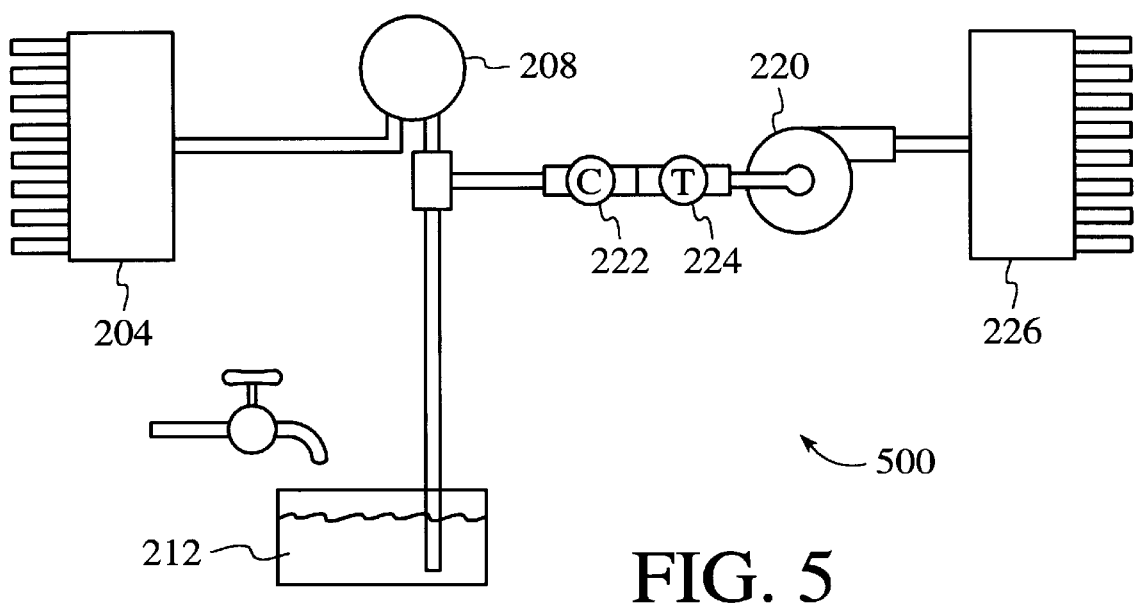

FIG. 5 illustrates an embodiment 500 of the present invention employing no flow meters. The pumping procedure is the same as that described above. The flow rate of chemical pump 208 is known (either by manufacturer specifications or by other calibration techniques). Accuracy of this embodiment of the present invention is dependent upon the stability of chemical pump 208. As before, solution conductivity cell and solution temperature cell 224 are optional.

Figure 6:
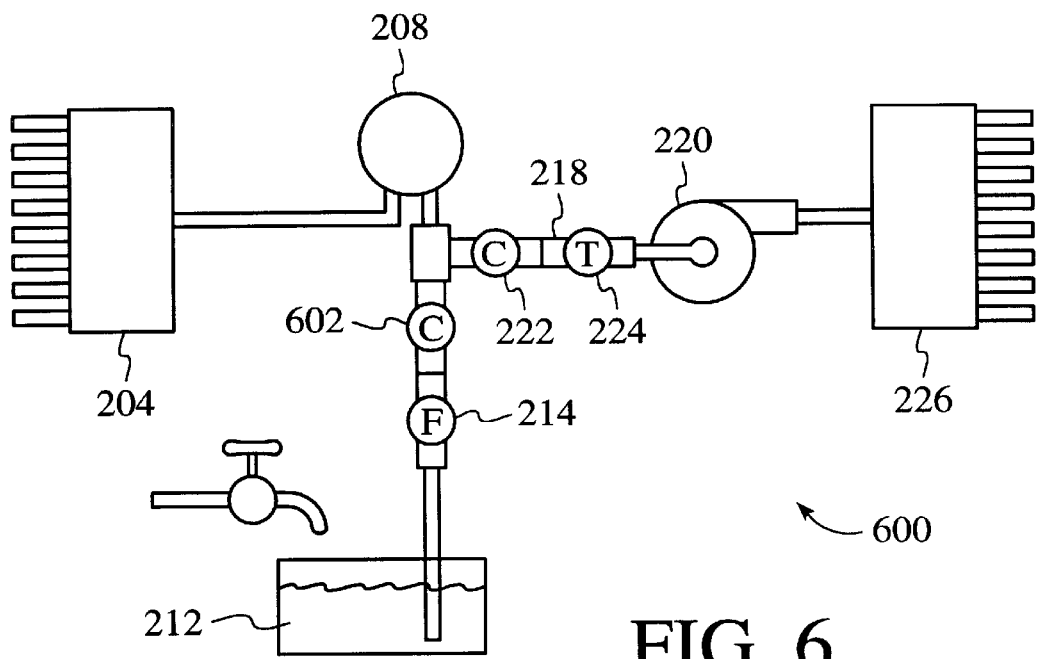

FIG. 6 illustrates an embodiment 600 of the present invention employing a water conductivity cell 602. The pumping procedure is the same as described above. In this embodiment, the presence of a conductive chemical in the solution flow tube 218 is determined by the instantaneous difference between the readings of solution conductivity cell 222 and water conductivity cell 602. The solution temperature cell 224 and the water flow meter 214 are optional in this embodiment.

Figure 7:
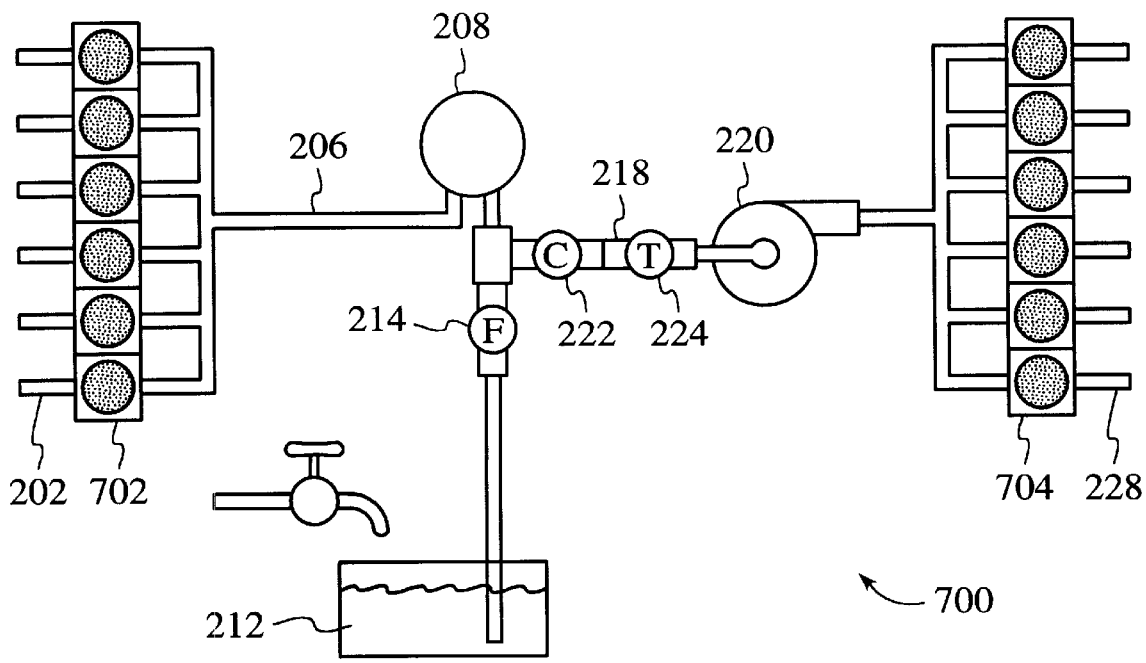

FIG. 7 illustrates an embodiment 700 of the chemical dispensing system 200 where the input multiplexer 204 and the output multiplexer 226 of FIG. 2 comprise a plurality of two-way valves 702 and 704, respectively. The pumping procedure is the same as described above. In this embodiment, a system input tube 202 or a system output tube 228 is operatively coupled to the chemical pump 208 or the transport pump 220, respectively, by opening a selected two-way valve 702 or 704, respectively. The two-way valves 702 and 704 are normally closed. Either set of two-way valves 702, 704 may be replaced by equivalent methods of multiplexing multiple system input: tubes 202 or system output tubes 228 to a single chemical flow tube 206 or solution flow tube 218, respectively. Water flow meter 214, solution conductivity cell 222, and solution temperature cell 224 are all optional in this embodiment.

Figure 8:
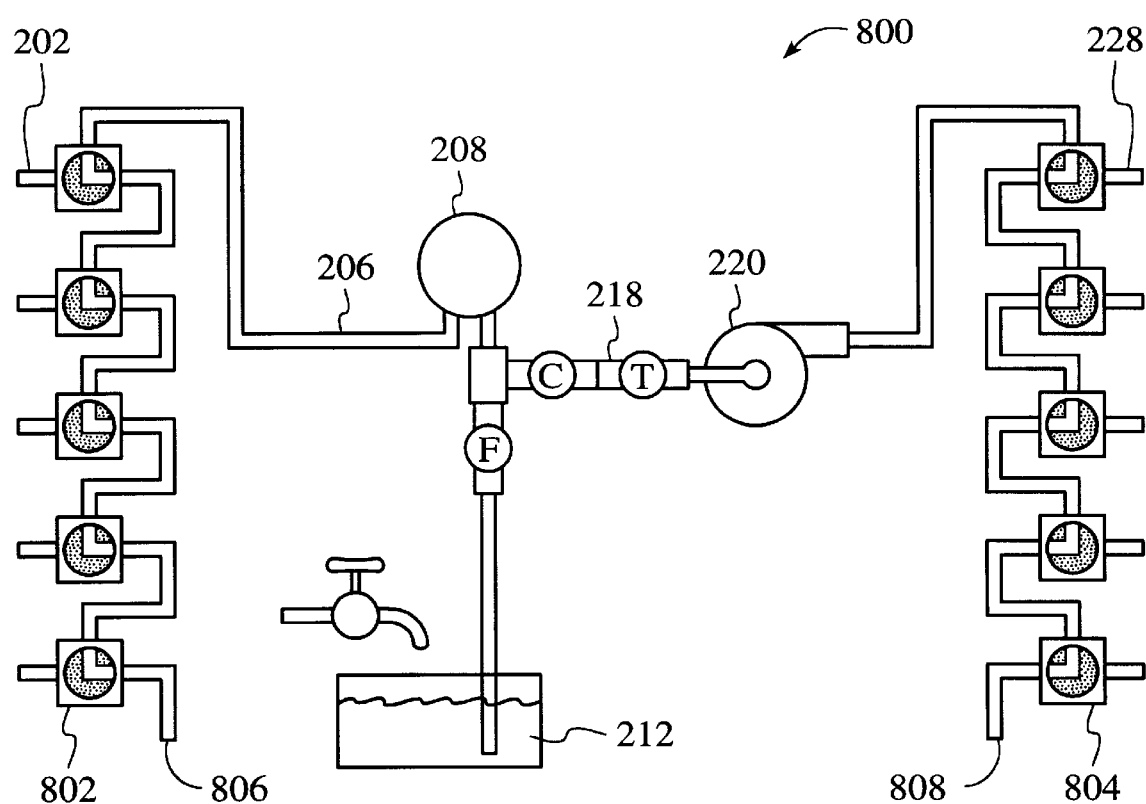

FIG. 8 illustrates an embodiment 800 that uses a three-way input valve 802 and three-way output valve 804 to selectively couple system input tubes 202 to chemical flow tube 206 and to selectively couple system output tubes 228 to solution flow tube 218. A drain 806, 808 is provided at the end of the chain of three-way input and output valves 802, 804, respectively. This embodiment provides an alternative procedure for flushing the system to a drain 806 or 808. Either of the sets of three-way valves 802, 804 may be replaced by their functional equivalents.

Figure 9A:
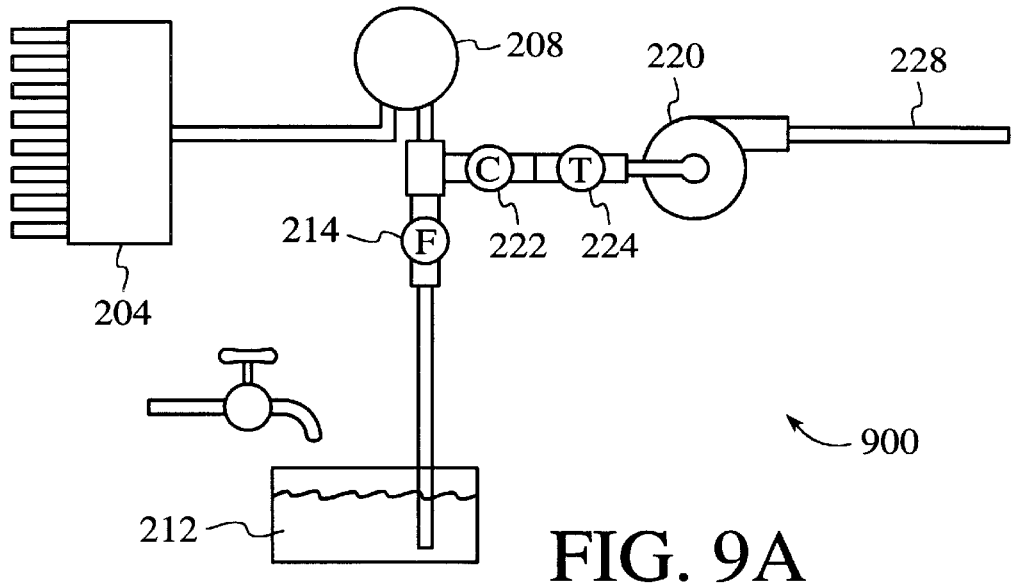

FIG. 9A illustrates an embodiment 900 of a chemical dispensing system employing only a single system output tube 228. In this embodiment, only one chemical receptacle, such as a washer, is served by chemical dispensing system 900. The pumping procedure is the same as that described above with reference to FIG. 2. Water flow meter 214, solution conductivity cell 222, and solution temperature cell 224 are again all optional in this embodiment.

Figure 9B:
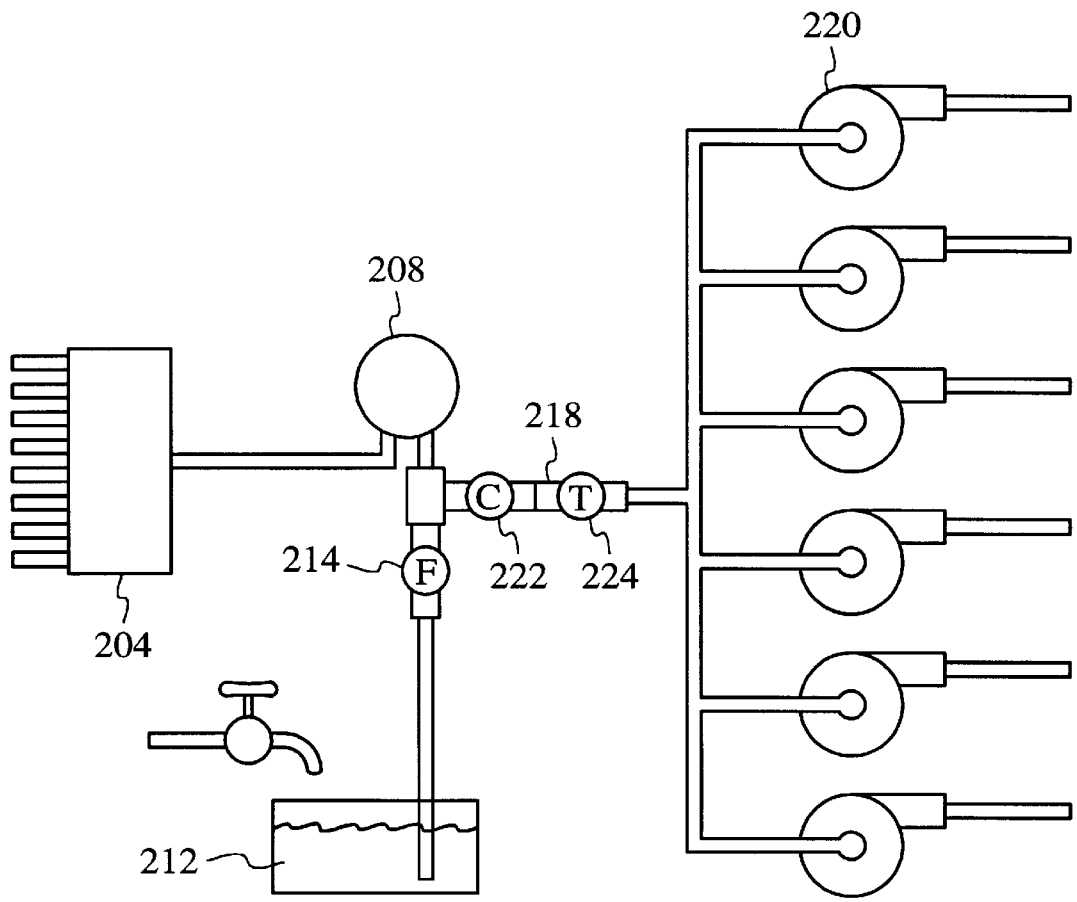

FIG. 9B illustrates another embodiment 950 of the present invention wherein a plurality of transport pumps 220 are coupled to the solution flow tube 218 which has been branched accordingly to connect to the plurality of transport pumps 220. The pumping procedure is the same as that described with reference to FIG. 2 except that the system output tube 228 that is served by the chemical dispensing system 200 is determined by which transport pump 220 is activated. Again, water flow meter 214, solution conductivity cell 222, and solution temperature cell 224 are optional.

Figure 10:
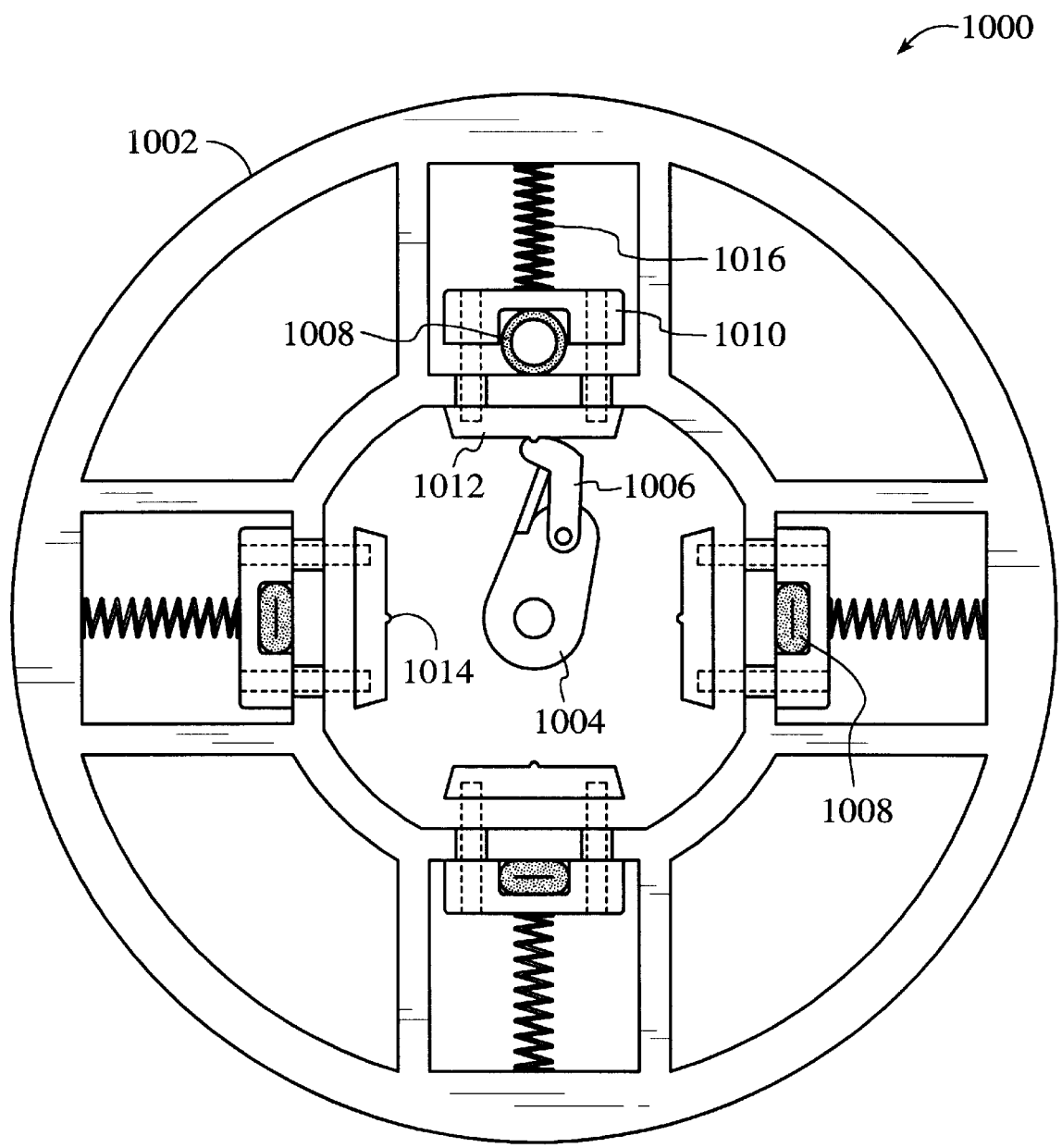
FIG. 10 shows a preferred embodiment of a multiplexer pinch valve system according to the present invention.

FIG. 10 illustrates the structure and operation of a preferred embodiment of a multiplexer pinch valve system 1000 according to the present invention which may be used in implementing either input multiplexer 204 or output multiplexer 226 shown in FIG. 2. The multiplexer pinch valve is located in housing 1002. Located at the center of housing 1002 is cam 1004 having a position indexing means. At the end of cam 1004 is a finger 1006 that opens a selected pinch tube 1008. In the chemical delivery system shown in FIG. 2, a selected pinch tube 1008 would either couple system input tube 202 to chemical flow tube 206 or couple solution flow tube 218 to system output tube 228. Each pinch tube 1008 is compressed by tube compressor 1110 in an unselected state. In operation, cam 1004 rotates in a clockwise direction, temporarily engaging each lifting platform 1012 and registration 1014. When the lifting platform 1012 for a selected pinch tube 1008 has been engaged and passed, cam 1004 is rotated back in a counterclockwise direction so that finger 1006 fully engages registration 1014, placing an upward force against lifting platform 1012. This upward force causes spring 1016 to contract, releasing tube compressor 1010 and opening the selected pinch tube 1008. The opening of selected pinch tube 1008 allows the flow of a desired chemical from the chemical supply into the chemical delivery system or the flow of a chemical solution from the chemical delivery system to a desired chemical receptacle.

Figure 11A:
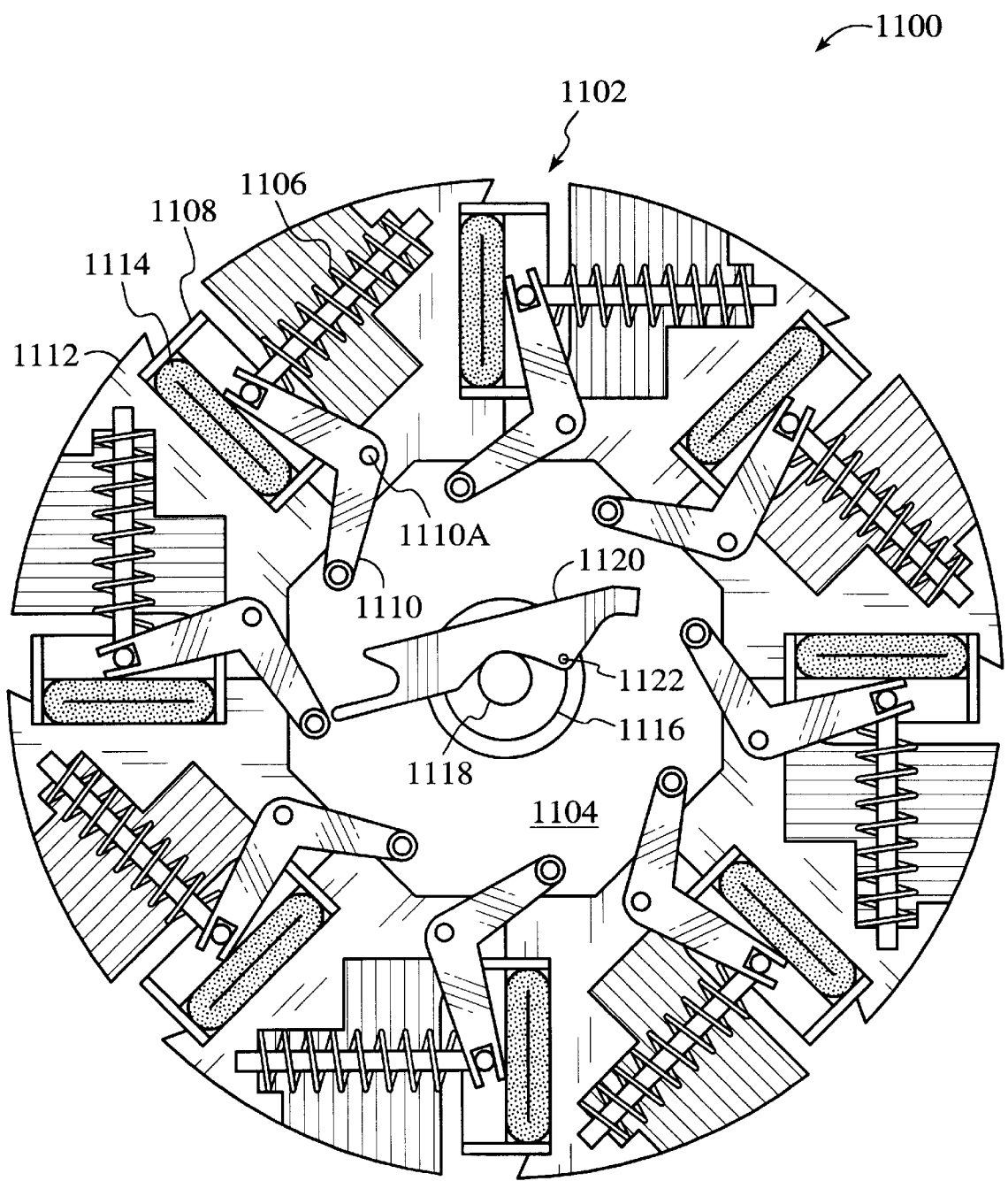
FIGS. 11A–11C show an alternate embodiment of a multiplexer pinch valve system according to the present invention.
Figure 11B:
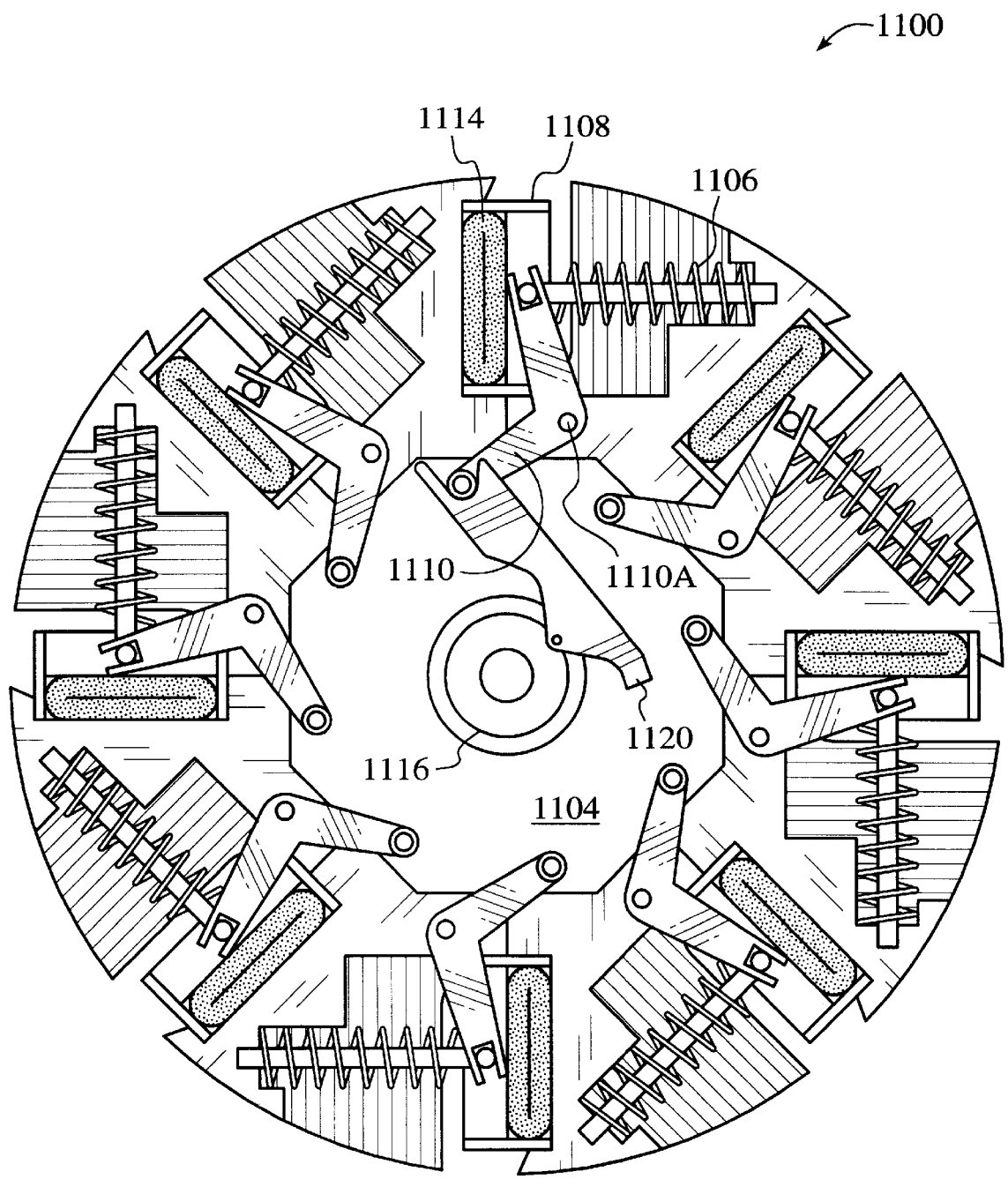
Figure 11C:
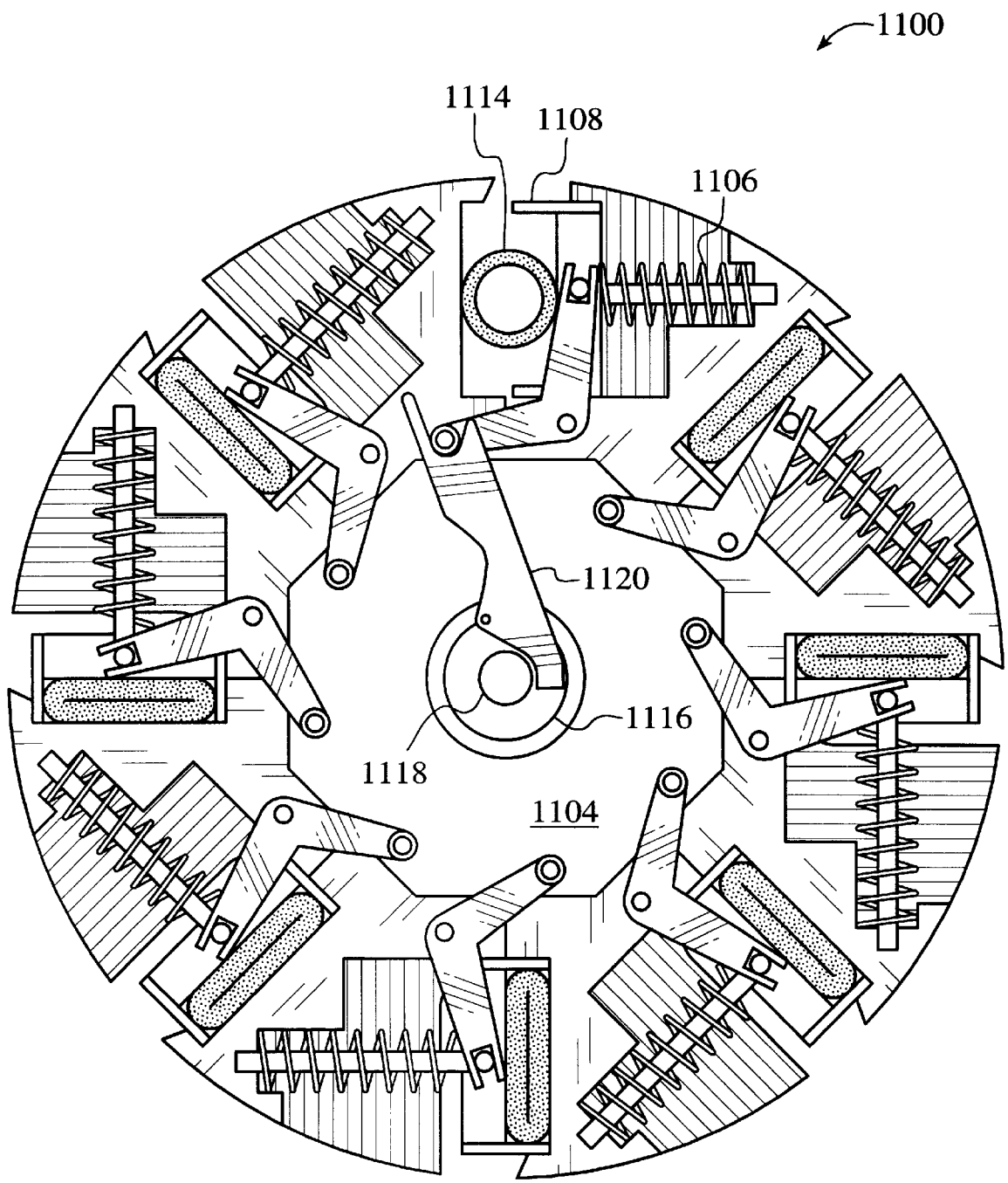

FIGS. 11A–11C illustrate the structure and operation of an alternate embodiment of a multiplexer pinch valve system 1100 according to the present invention which may be used in implementing either input multiplexer 204 or output multiplexer 226 shown in FIG. 2. In FIG. 11A, a plurality of pinchers 1102 are circumferentially disposed about a flow enabler 1104. Each pincher 1102 comprises a spring mechanism 1106, a pressure plate 1108 and a rocker arm 1110. Each spring mechanism 1106 is coupled at one end to a housing 1112 of the multiplexer pinch valve system 1100 and at another end to the pressure plate 1108. A rocker arm 1110 is coupled at one end to pressure plate 1108 and at another end to flow enabler 1104. The pivot point 1110A of rocker arm 1110 is coupled to housing 1112. Rocker arm 1110 is adapted to be coupled to flow enabler 1104 when a pinch tube 1114 corresponding to the pincher 1102 is selected. In the chemical delivery system shown in FIG. 2, a selected pinch tube 1114 would either couple system input tube 202 to chemical flow tube 206 or couple solution flow tube 218 to system output tube 228. Flow enabler 1104 comprises a rotatable base 1116 mounted about a center post 1118. A pawl arm 1120 is mounted to the rotatable base 1116 at a pivot point 1122. The pivot point 1122 allows the pawl arm 1120 to engage rocker arm 1110. As shown in FIG. 11A, all pinch tubes 1114 are normally in a closed position.

FIG. 11B illustrates the process of selecting a desired pincher 1102 by rotating flow enabler 1104 in a clockwise direction. By rotating flow enabler 1104 in this manner, pawl arm 1120 engages rocker arm 1110, which moves pawl arm 1120 away from rotatable base 1116. Once engaged, rocker arm 1110 will pivot about pivot point 1110A. This pivoting will in turn act against spring mechanism 1106 and will relieve the pinching force applied by spring mechanism 1106 on pinch tube 1114 via pressure plate 1108, thereby selecting and opening a desired pinch tube 1114.

FIG. 11C illustrates a selected pinch tube 1114 in its fully open position. As shown in the figure, when the pinching force is released, selected pinch tube 1114 will open, allowing the flow of a desired chemical from the chemical supply into the chemical delivery system or the flow of a chemical solution from the chemical delivery system to a desired chemical receptacle. In order to secure the valve selection, pawl arm 1120 engages center post 1118, thereby stopping the rotatable base 1116 from rotating further.

Figure 12A:
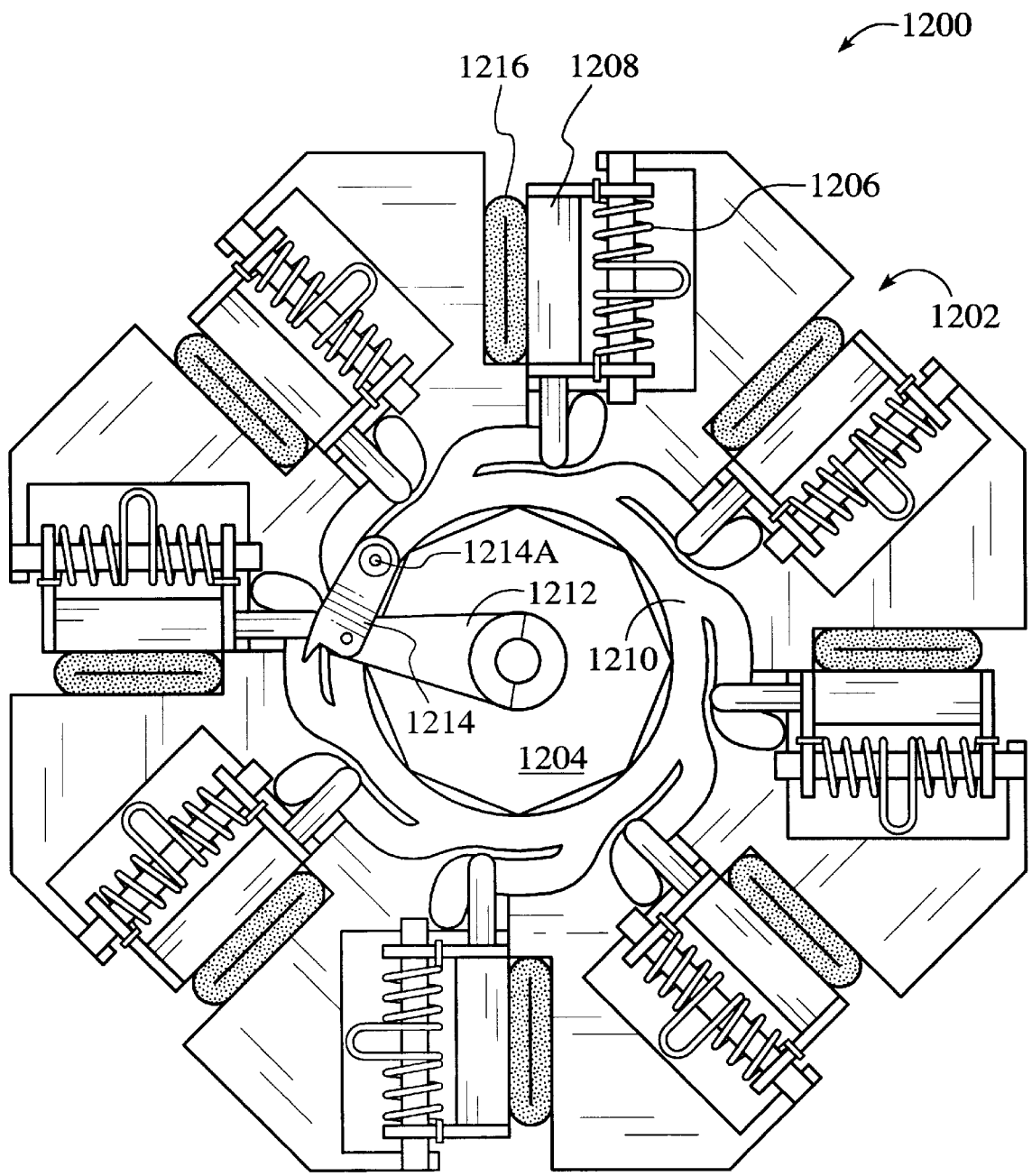
FIGS. 12A–12C show an alternate embodiment of a multiplexer pinch valve system according to the present invention.
Figure 12B:
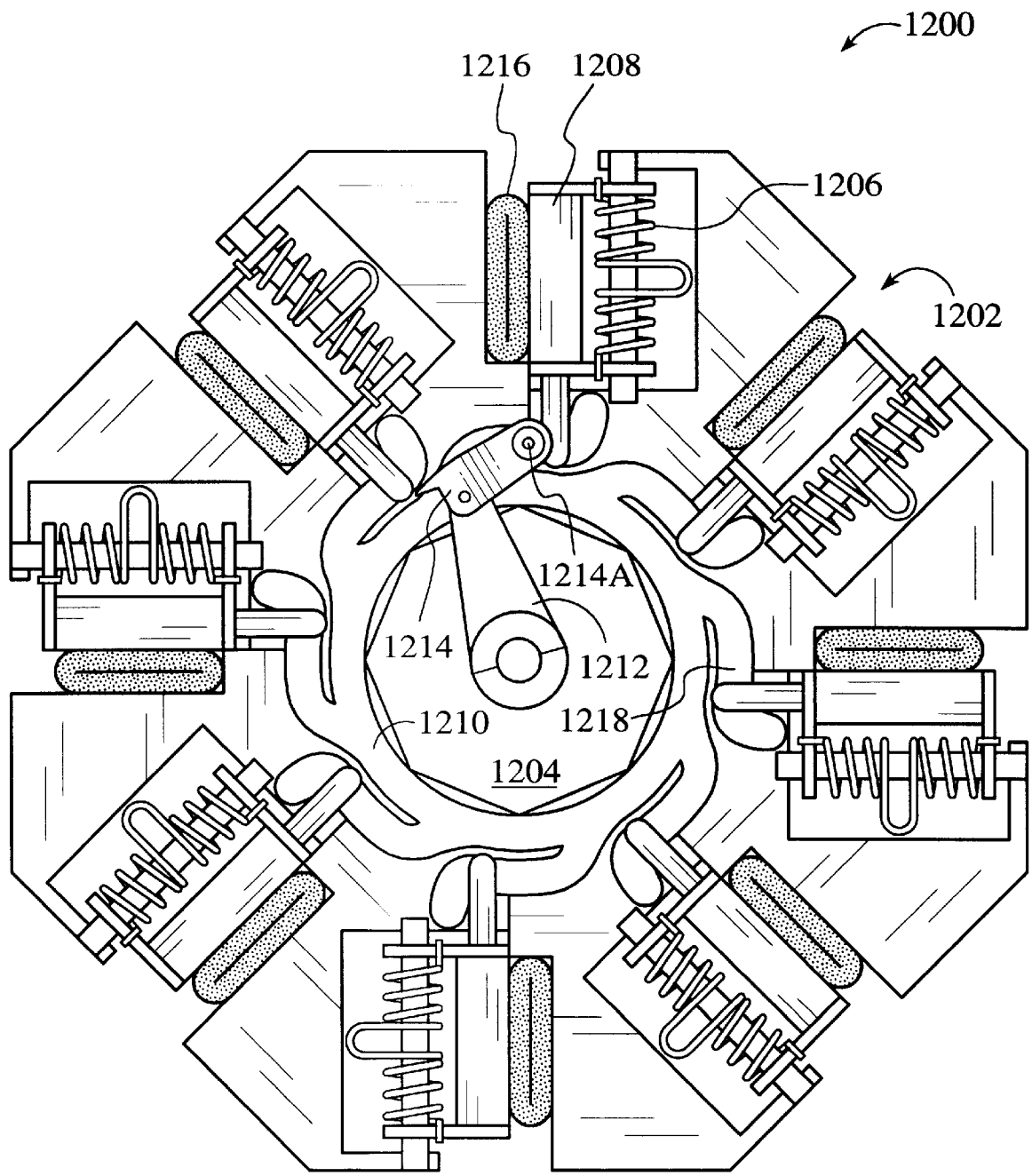
Figure 12C:
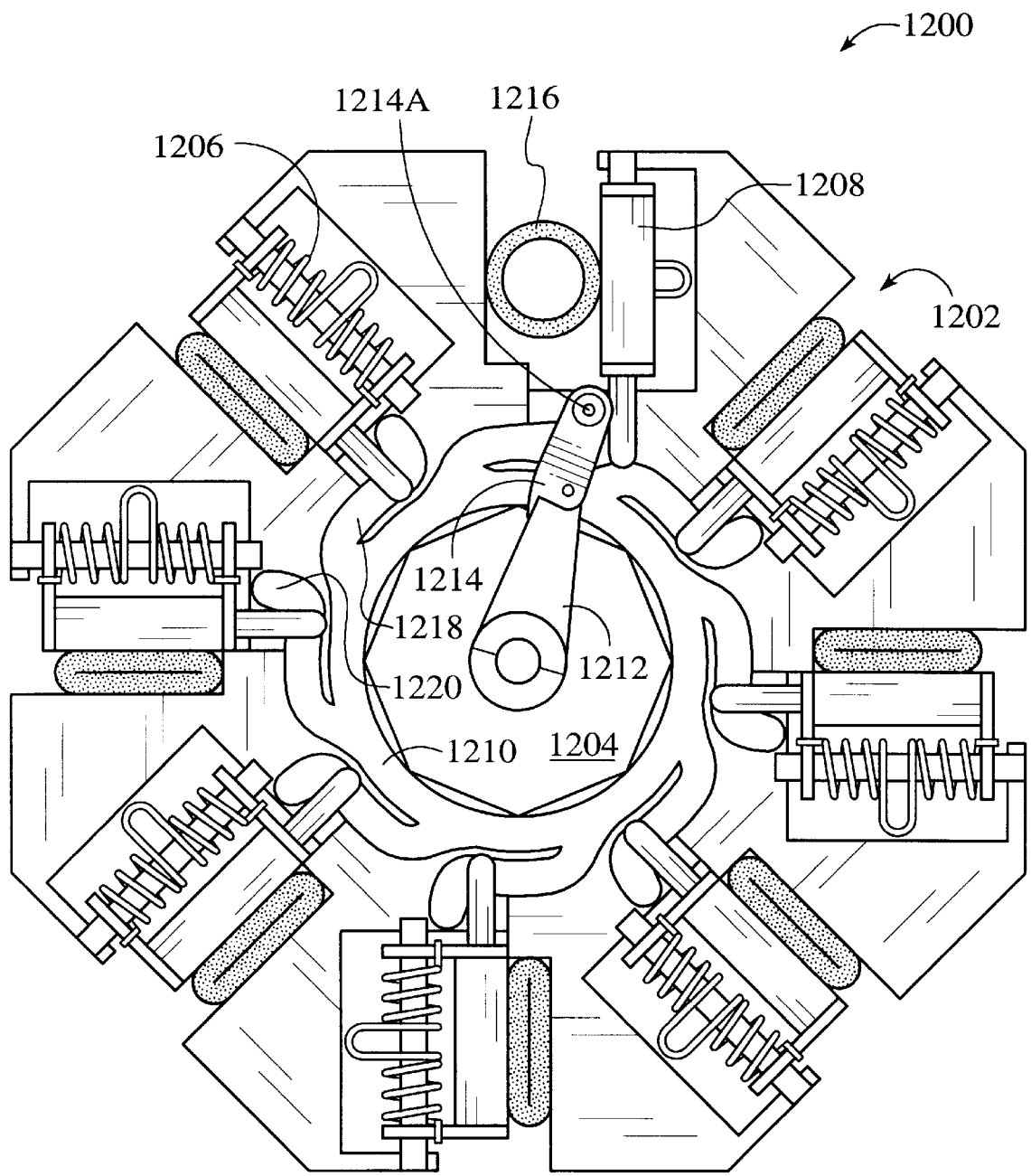

FIGS. 12A–C illustrate an alternate embodiment of a multiplexer pinch valve system 1200 according to the present invention which may be used in implementing either input multiplexer 204 or output multiplexer 226 shown in FIG. 2. The structure and operation of pinch valve 1200 is similar to that of pinch valve 1100 shown in FIGS. 11A–C.

In FIG. 12A, a plurality of pinchers 1202 are circumferentially disposed about a flow enabler 1204. Each pincher 1202 comprises a spring mechanism 1206 and a pressure plate 1208. Pressure plate 1208 is coupled to race 1210 that encircles flow enabler 1204. Flow enabler 1204 includes a crank 1212 and a pawl 1214 coupled to the crank that rides in race 1210 on pawl roller 1214A. In the chemical delivery system shown in FIG. 2, a selected pinch tube 1216 would either couple system input tube 202 to chemical flow tube 2016 or couple solution flow tube 218 to system output tube 228. As shown in FIG. 12, all pinch tubes 1216 are normally in a closed position.

As shown in FIG. 12B, crank 1212 rotates counterclockwise, driving pawl roller 1214A through race 1210 to select one of pinch tubes 1216 to be opened. When a tube has been selected, crank 1212 is rotated in a clockwise direction to engage pawl roller 1214A with the selected pressure plate 1208 in an outer circumferential region 1218 of race 1210. FIG. 12C illustrates that crank 1212 continues to rotate in a clockwise direction, forcing pressure plate 1208 away from pinch tube 1216. Pawl roller 1214A locks into the end portion 1220 of outer circumferential region 1218 of race 1210, which opens the selected pinch tube 1216 and locks it into an open position.

Figure 13A:
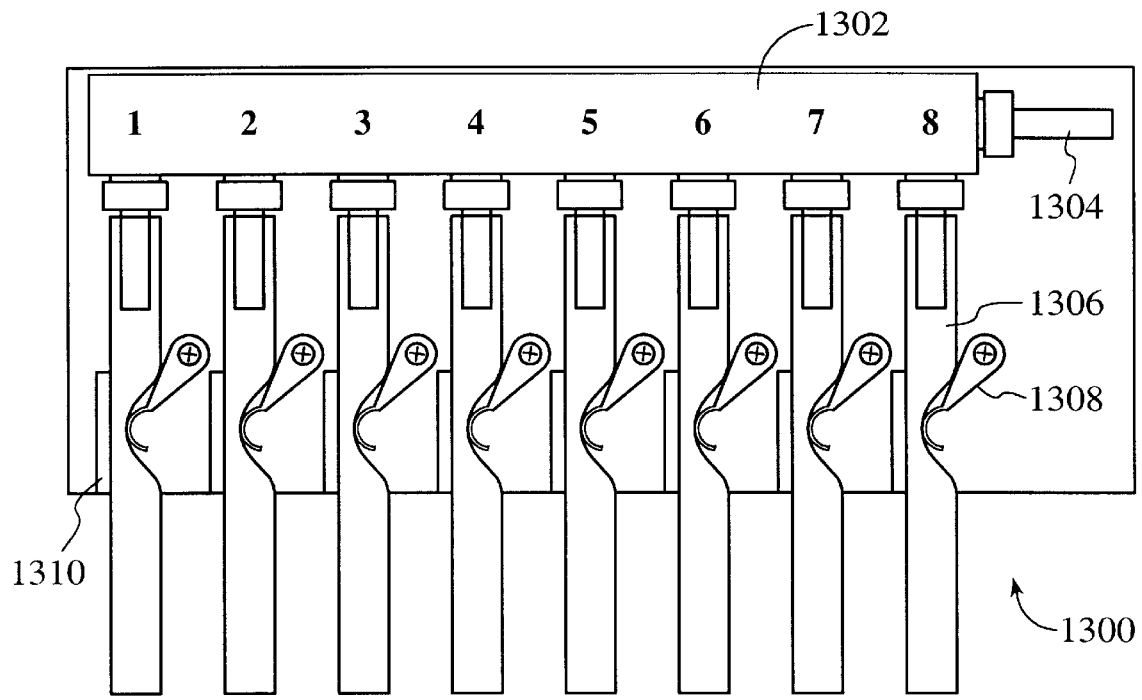
FIGS. 13–15 show an alternate embodiment of a multiplexer pinch valve system according to the present invention.
Figure 13B:
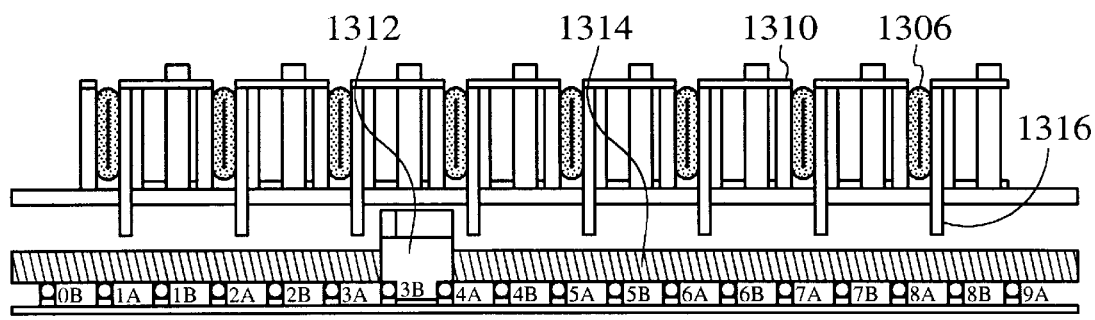
Figure 13C:
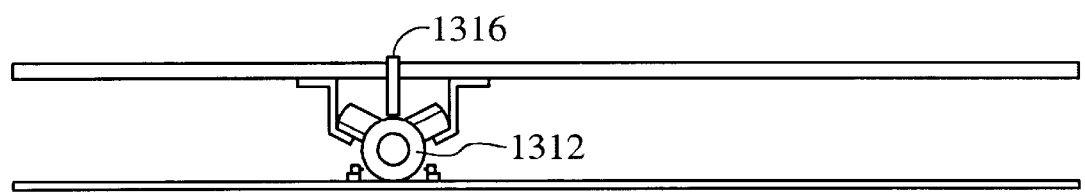

FIG. 13A shows a front view of another embodiment of a multiplexing pinch valve 1300 according to the present invention which may be used to implement either input multiplexer 204 or output multiplexer 226 shown in FIG. 2. Pinch valve 1300 includes a linear manifold 1302 that couples a common port 1304 to a plurality of pinch tubes 1306. A spring-loaded pinch arm 1308 holds a corresponding pinch tube 1306 closed by pinching it against a pressure plate 1310. FIG. 13B shows a cross-section view underneath pinch valve 1300. Cam 1312 sits adjacent to pinch arms 1308 and rides along lead screw 1314. FIG. 13C shows a view of cam 1312 along the axis of the lead screw. In the transition position, as depicted in FIGS. 13A–C, cam 1312 slides along lead screw 1314 until the selected valve actuator 1316 is encountered.

Figure 14A:
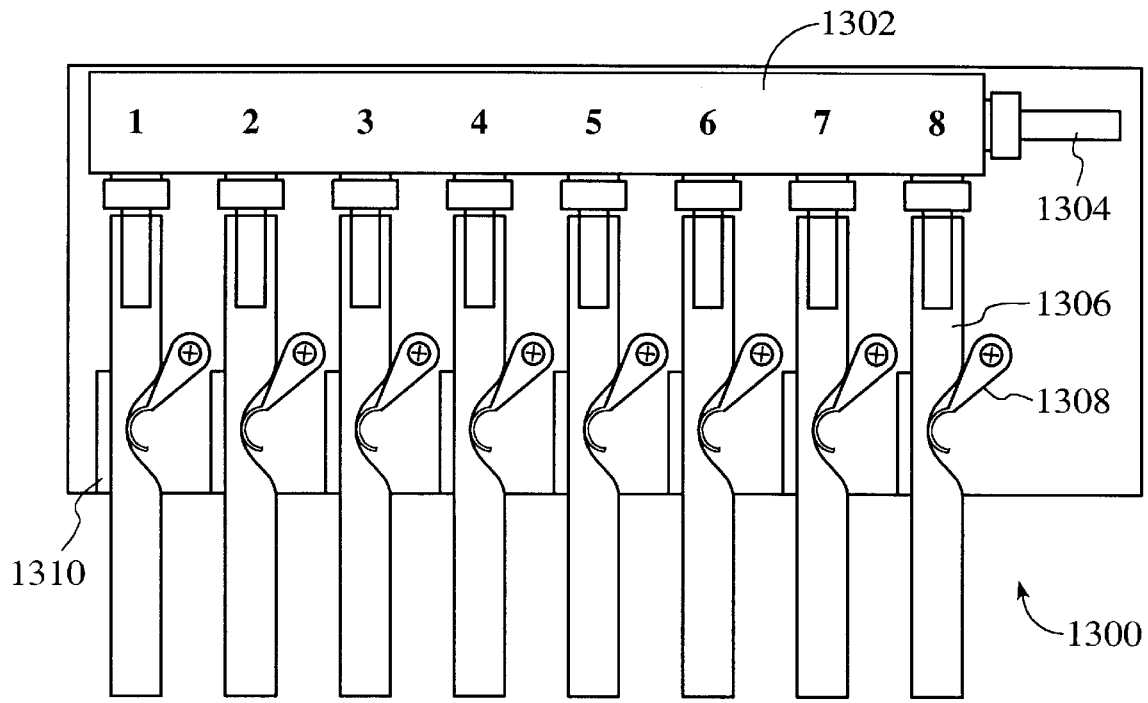
Figure 14B:
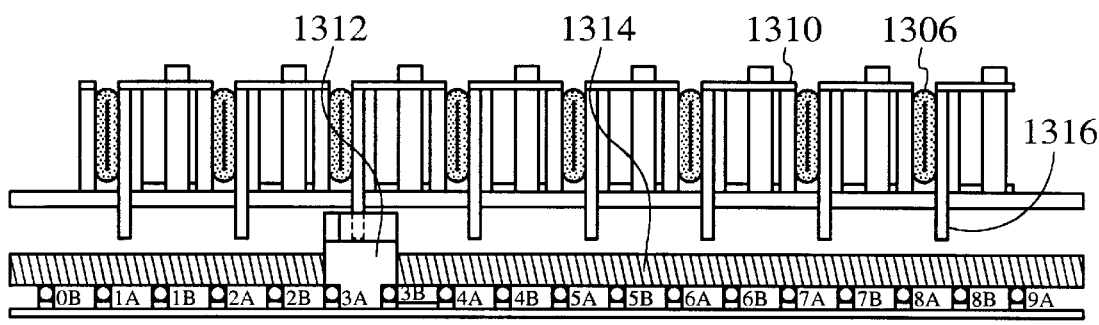
Figure 14C:
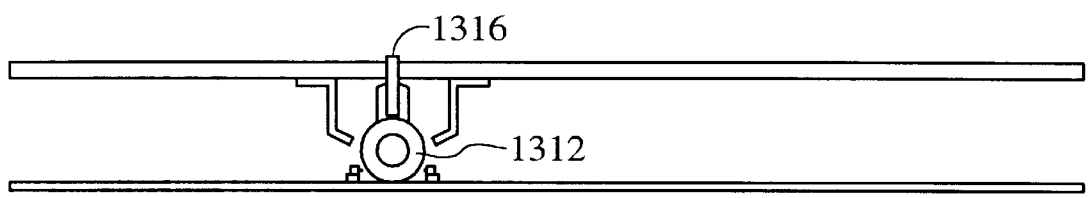

FIGS. 14A–C show pinch valve 1300 in the engagement position. In FIG. 14A, the front view of pinch valve 1300 shows each spring-loaded pinch arm 1308 still holds its corresponding pinch tube 1306 closed by pinching it against a pressure plate 1310. FIG. 14B shows a cross-section view of pinch valve 1300 in the engagement position, in which cam 1312 has engaged the selected valve actuator 1316 coupled to the desired pinch tube 1306. FIG. 14C shows the view along the lead screw of cam 1312, which depicts how cam 1312 has clamped onto the selected valve actuator 1316. In this embodiment, cam 1312 rotates clockwise to engage selected valve actuator 1316. By continuing to rotate the lead screw of cam 1312 clockwise, selected pinch arm 1308 is pulled to one side, opening the corresponding pinch tube 1306.

Figure 15A:
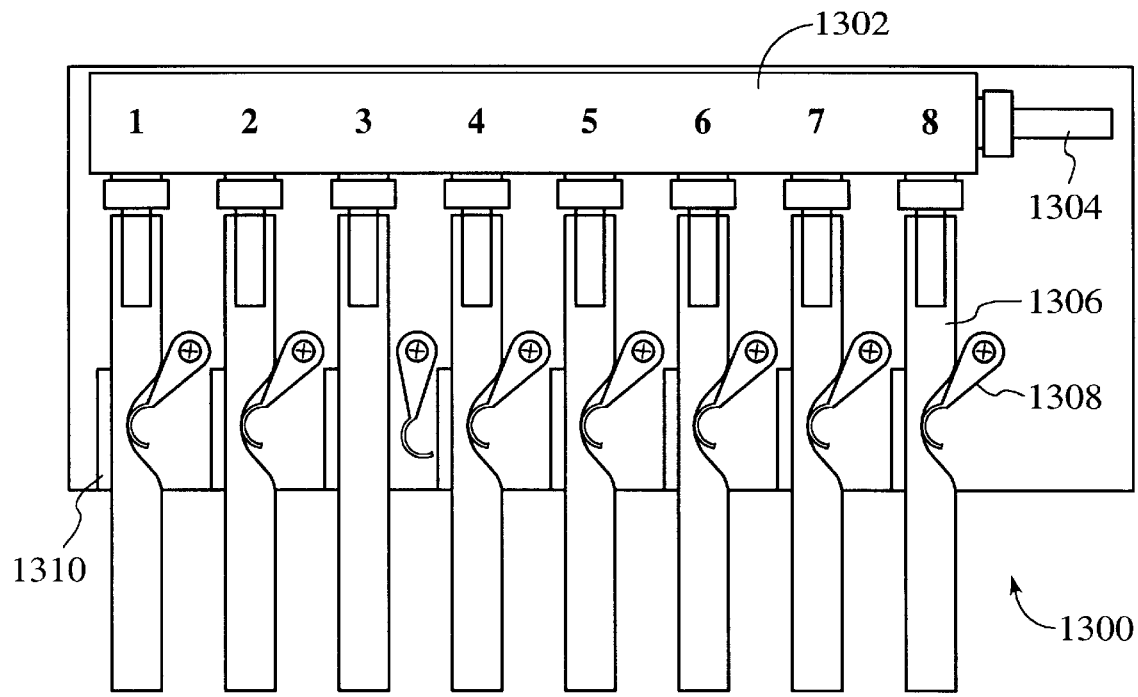
Figure 15B:
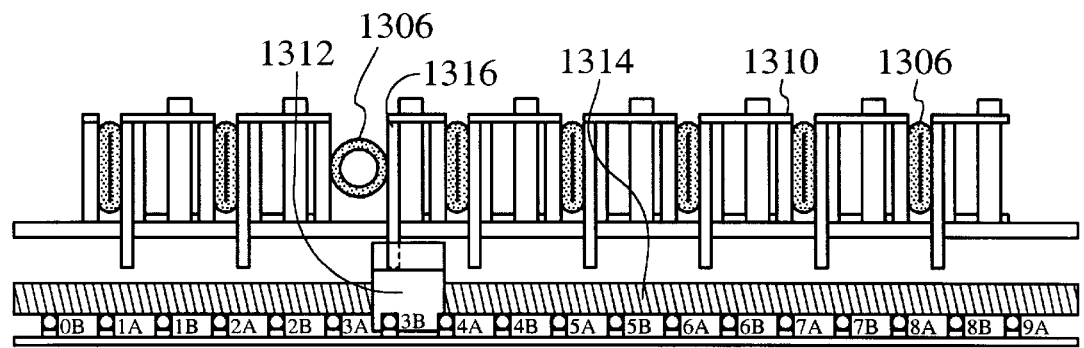
Figure 15C:
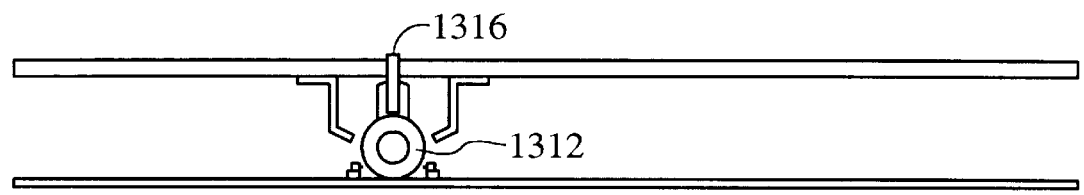

FIGS. 15A–C show pinch valve 1300 in the open position. FIG. 15A shows the front view of valve 1300, where the selected pinch arm 1308 has been pulled aside, completely opening corresponding pinch tube 1306 to allow the flow of fluid through common port 1304. FIG. 15B shows a cross-section view of pinch valve 1300 in the open position, in which cam 1312 has pulled valve actuator 1316 to one side, away from pressure plate 1310, opening pinch tube 1306. FIG. 15C shows cam 1312 clamped onto valve actuator 1316.

Figure 16A:
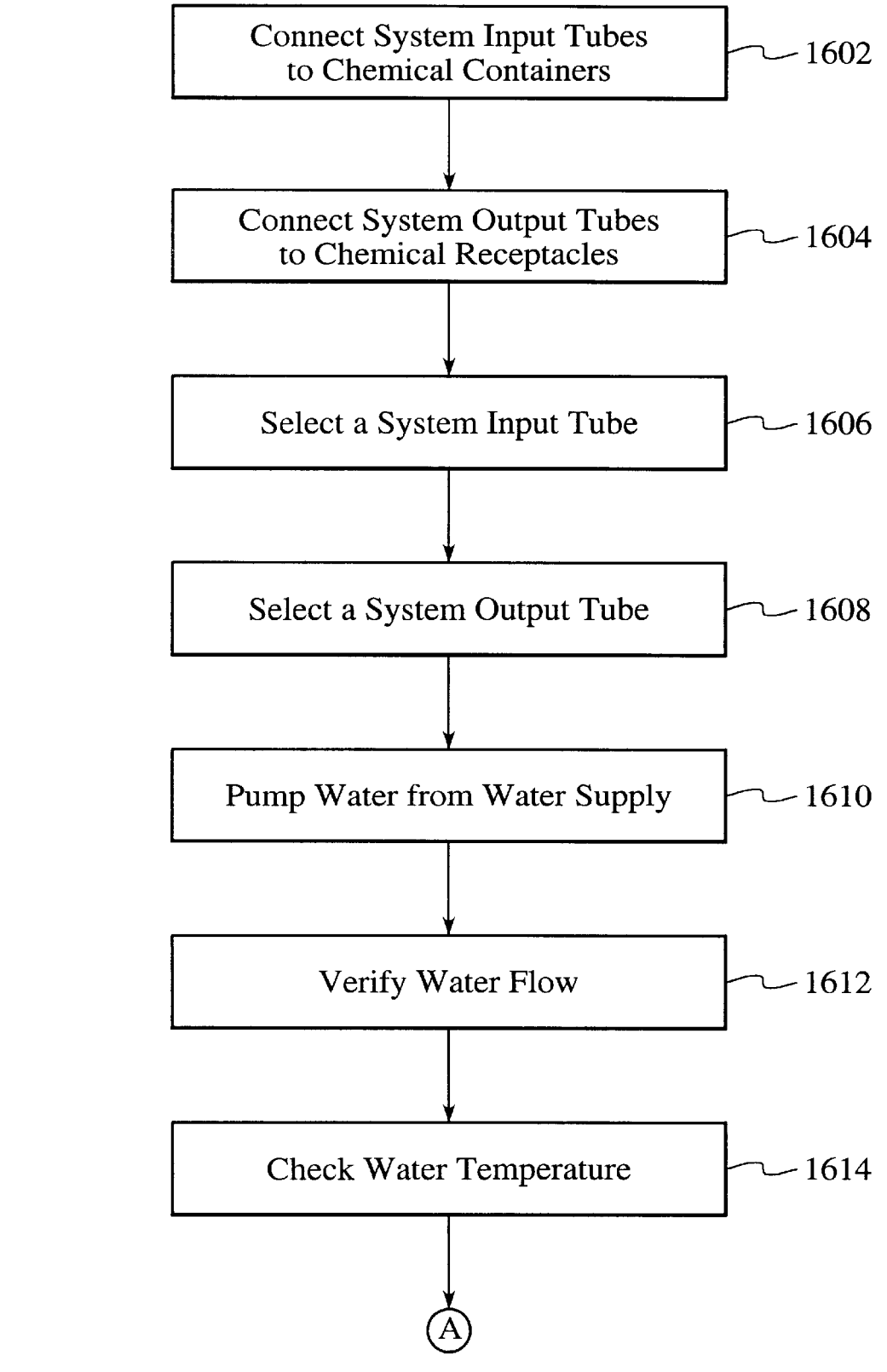
FIG. 16 is a flow chart showing a method of dispensing multiple chemicals according to the present invention.
Figure 16B:
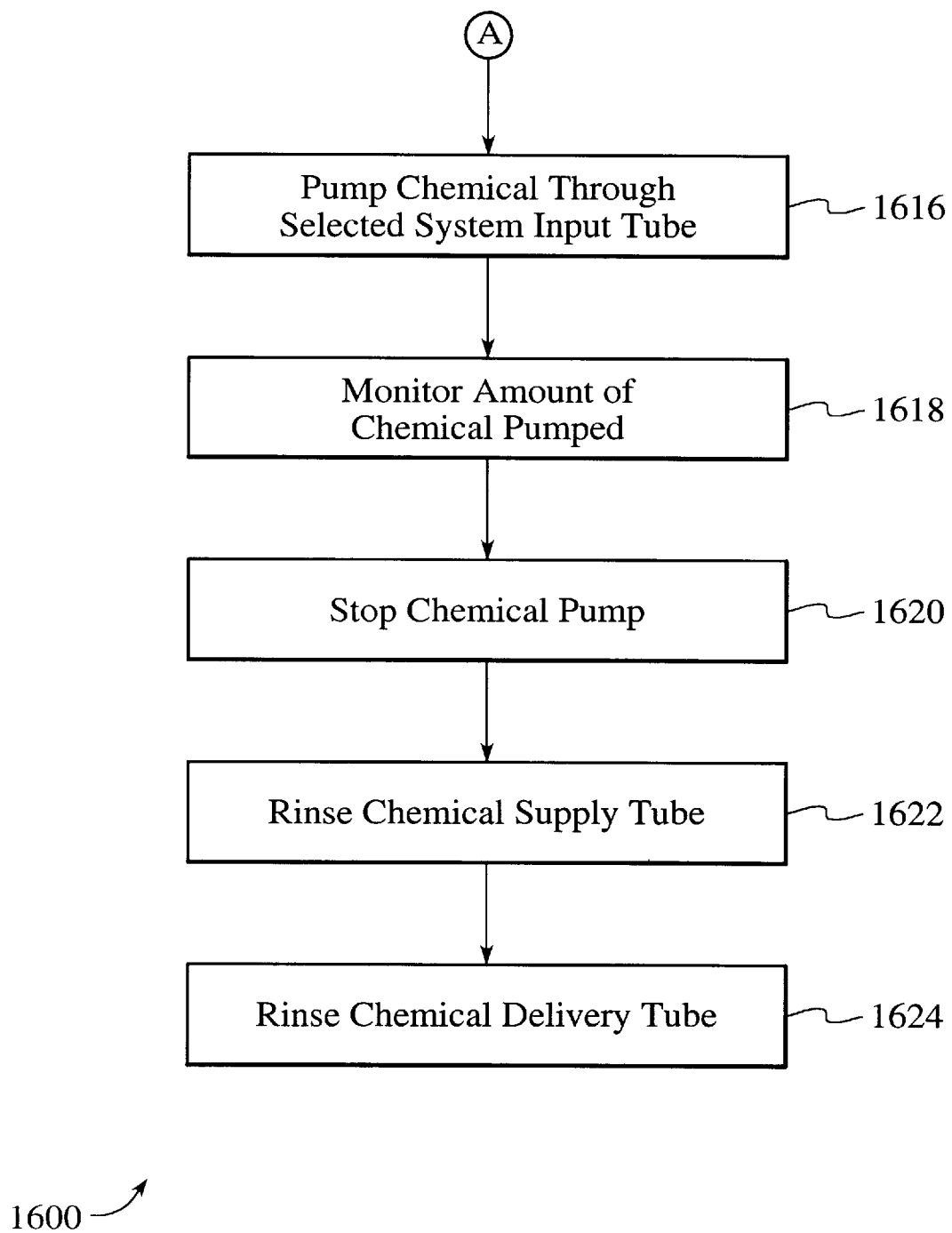

Finally, FIGS. 16A and 16B illustrate an overall method 1600 for dispensing a chemical according to a preferred embodiment of the present invention. At step 1602, a multiplexed set of input tubes is connected to a plurality of chemical containers which hold the chemicals to be dispensed by the system.

At step 1604, a multiplexed set of output tubes is connected to chemical receptacles that are adapted to receive the chemicals dispensed by the system. Examples of these receptacles include, but are not limited to, industrial clothes washing machines.

At steps 1606 and 1608, respectively, a system input tube and a system output tube are selected. According to a preferred embodiment of the present invention, such selection is achieved by opening a normally-closed portion of said input and said output tubes, respectively. The tubes may be held in a normally-closed state by a number of methods. Such methods include, but are not limited to, impressing a pinching force on a portion of the tube to restrict a flow therein, or by placing a mechanical valve in the tube.

At step 1610, water is pumped from a water supply to the selected output tube. Pumping water from a water supply is typically achieved by inserting a pump in series with tubing connecting the water supply and the selected output tube.

At step 1612, the flow of the water from the water supply is verified. Verification of water flow in a tube may be achieved by several methods, including, for example, monitoring a flow meter inserted in the tubing connecting the water supply and the selected output tube.

At step 1614, the temperature of the water is checked. Measuring the temperature of water flowing in a tube also may be achieved by various methods. In a preferred embodiment of the present invention, a temperature cell in inserted in the tubing connecting the water supply and the selected system output tube. It should be noted that this step may be skipped if the temperature of the water to be mixed with a chemical corresponding to the selected system input tube is not critical.

At step 1616, a chemical from the container connected to the selected system input tube is pumped into the system through the selected input tube. Chemicals that may be used with the system are not only caustic, but often have a high viscosity (e.g., >1,000 cps). Pumping such chemicals is well known in the art and may be achieved by inserting a chemical pump in series with the tubing connecting the chemical container and the system. The pumped chemical is then mixed with the water pumped from the water supply, and pumped through the selected system output tube.

At step 1618, the amount of chemical pumped is monitored. This monitoring of the amount of chemical pumped may take several forms. For example, one method would be to use the known flow rate of the pump that pumps the chemical and the amount of time required to pump the chemical. In this method, the flow rate is multiplied by the time required to pump the chemical, which is then compared against a predetermined amount of chemical desired to be pumped. Alternative methods of monitoring the amount of chemical pumped include, but are not limited to, including a flow meter within the tubing containing the chemical pumped before mixing with the water or providing a chemical pump which itself can measure the amount of chemical actually pumped.

At step 1620, the chemical pump is stopped. To determine when to stop the chemical pump, a predetermined amount of desired chemical is compared against the amount of pumped chemical either measured or estimated in step 1618. Once the amount of pumped chemical either measured or estimated in step 1618 exceeds or reaches the predetermined amount of desired chemical, the chemical pump is then turned off.

In step 1622, the chemical pump is reversed to draw water through the tubing connecting the selected system input tube with the remainder of the system up to the point where the chemical and water mix. This step serves to cleanse the tubing of the chemical remaining therein. This step is especially important when using chemicals of a caustic nature which tend to corrode the tubing of the system. In a preferred aspect of the present invention, this step continues until most of the system input tubes are thoroughly cleansed of any residual chemical, but terminates before the water can reach the chemical containers connected to the system input tubes.

At step 1624, the remaining tubing connecting the point in the system where the chemical is mixed with the water through the selected system output tube is cleansed of any residual chemical remaining in the tubing. This step serves to prolong the life of the tubing by removing any caustic chemicals remaining therein and also improves the quality of the system by assuring that undesired chemical reactions with subsequent chemicals pumped through the system do not occur.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method for dispensing liquids in a system having a first transport means including a pump, a reservoir of chemicals, a collapsible input tube one end of which is in fluid communication with said reservoir, with said remaining end having an aperture in fluid communication with said pump, a chemical flow tube coupled to a water flow tube, with said water flow tube being in fluid communication with a supply of water, said method comprising the steps of:

selectively placing said reservoir in fluid communication with said pump;

transporting a chemical flow from said input tube through said chemical transport means under force of said pump;

transporting a flow of water from said supply of water through said water flow tube;

combining said chemical flow and said flow of water to form a diluted chemical solution; and transporting said diluted chemical solution through a solution flow tube to a system output tube.

2. The method of dispensing liquid chemicals according to claim 1 further comprising the steps of:

determining an amount of chemical transported through said chemical transport means; and terminating said transporting of said chemical once a predetermined amount of said chemical has been transported through said chemical transport means.

3. The method of dispensing liquid chemicals according to claim 2 further comprising the step of continuing to transport said water through said system output tube after terminating said transporting of said chemical until substantially all of said predetermined amount of chemical is transported out of said system output tube.

4. The method of dispensing liquid chemicals according to claim 2 further comprising the step of transporting water from said water supply toward said selected system input tube, after said terminating step, until substantially all of said chemical is removed from said chemical transport and said chemical flow tube.

5. The method of dispensing liquid chemicals according to claim 1 further comprising the steps of:

measuring a conductivity of said solution;

measuring a conductivity of said water; and comparing said solution conductivity and said water conductivity, whereby a difference in said solution conductivity and said water conductivity indicates whether a conductive chemical is present in said solution.

6. The method of dispensing liquid chemicals according to claim 1 further comprising the step of measuring a temperature of said solution.

7. The method of dispensing liquid chemicals according to claim 1 further comprising the step of measuring a flow rate of said water before said step of combining said water with said chemical.

8. The method of dispensing liquid chemicals according to claim 1 further comprising the step of measuring a flow rate of said diluted solution.

9. The method of dispensing liquid chemicals according to claim 1 wherein said step of coupling a chemical transport means to a plurality of input tubes comprises the steps of:
 multiplexing said plurality of system input tubes to said chemical transport means;
 selecting one of said plurality of system input tubes; and
 opening a normally-closed portion of said selected input tube.

10. The method of dispensing liquid chemicals according to claim 9 wherein the step of opening a normally-closed portion of said selected input tube comprises reducing a force pinching said tube.

11. The method of dispensing liquid chemicals according to claim 9 wherein the step of opening a normally-closed tube comprises altering a condition of a valve in said tube.

12. The method of dispensing liquid chemicals according to claim 1 further comprising the steps of:
 multiplexing a plurality of system output tubes to a solution transport means;
 selecting one of said plurality of system output tubes; and
 opening a normally-closed portion of said selected system output tube.

13. The method of dispensing liquids according to claim 1 wherein said selectively placing step includes varying a cross-sectional area of said aperture.

14. A liquid chemical dispensing system for use with a plurality of liquid chemical containers, said system comprising:
 a first fluid transport means;
 a plurality of system input tubes;
 an input multiplexer coupling said plurality of system input tubes to said first transport means, said input multiplexer operatively coupling a selected system input tube to said first transport means, said input multiplexer including a plurality of first multiplexer tubes, at least a portion of each of said first multiplexer tubes capable of being pinched in order to restrict a flow of a chemical in said tube, a plurality of pinchers, each of said pinchers coupled to a corresponding first multiplexer tube, and pinchers pinching said corresponding first multiplexer tube if said corresponding first multiplexer tube is not selected; and a flow enabler coupled to a pincher corresponding to a selected first multiplexer tube, with each of said pinchers including a spring mechanism, said spring mechanism for establishing a force on said corresponding first multiplexer tube thereby pinching said first multiplexer tube;
 a water supply; and
 a second fluid transport means coupled to said water supply and to said first fluid transport means, wherein an output of said second fluid transport means comprises a solution of said selected liquid chemical and said water.

15. The liquid chemical dispensing system according to claim 14 further comprising a solution conductivity cell for measuring a conductivity of said solution.

16. The liquid chemical dispensing system according to claim 14 further comprising a water conductivity cell for measuring a conductivity of said water.

17. The liquid chemical dispensing system according to claim 14 further comprising a temperature cell for measuring a temperature of said solution.

18. The liquid chemical dispensing system according to claim 14 wherein said input multiplexer comprises:
 a plurality of system input tubes coupled in parallel;
 a plurality of three-way input valves, each three-way input valve disposed along a corresponding system input tube;
 at least one three-way input-valve connecting tube coupling two three-way input valves.

19. The liquid chemical dispensing system according to claim 14 further comprising a plurality of transport pumps, each of said plurality of transport pumps coupled to said first transport means and to said water supply, wherein an output of each of said transport pumps may be a solution of said selected chemical and said water.

20. The liquid chemical dispensing system according to claim 14 wherein said plurality of chemicals comprises chemicals having a high viscosity.

21. The liquid chemical dispensing system according to claim 15 wherein said first transport means comprises a metering pump.

22. The liquid chemical dispensing system according to claim 14 wherein said second transport means comprises a metering pump.

23. The liquid chemical dispensing system according to claim 14 further comprising an output multiplexer coupling said second fluid transport means to a plurality of system output tubes.

24. The liquid chemical dispensing system according to claim 23 wherein said output multiplexer comprises:
 a plurality of two-way output valves, each two-way output valve disposed along a corresponding system output tube; and
 a plurality of two-way output-valve input tubes, each two-way output-valve input tube coupled to a corresponding two-way output valve and an output-multiplexer input tube.

25. The liquid chemical dispensing system according to claim 23 wherein said output multiplexer comprises:
 a plurality of three-way output valves, each three-way output valve disposed along a corresponding system output tube; and
 at least one three-way output-valve connecting tube coupling two three-way output valves.

26. The liquid chemical dispensing system according to claim 25 wherein said plurality of three-way output valves comprises a first three-way output valve coupled to said second transport means.

27. The liquid chemical dispensing system according to claim 25 wherein said plurality of three-way output valves comprises a second three-way output valve coupled to a drain.

28. The liquid chemical dispensing system according to claim 14 wherein said input multiplexer comprises:
 a plurality of first multiplexer tubes, at least a portion of each of said first multiplexer tubes capable of being pinched in order to restrict a flow of a chemical in said tube;
 a plurality of pinchers, each of said pinchers coupled to a corresponding first multiplexer tube, each of said pinchers pinching said corresponding first multiplexer tube if said corresponding first multiplexer tube is not selected; and
 a flow enabler coupled to a pincher corresponding to a selected first multiplexer tube.

29. The liquid chemical dispensing system according to claim 28 wherein each of said pinchers comprises a spring mechanism, said spring mechanism for establishing a force on said corresponding first multiplexer tube thereby pinching said first multiplexer tube.

30. The liquid chemical dispensing system according to claim 28 wherein said input multiplexer comprises a housing.

31. The liquid chemical dispensing system according to claim 30 wherein each of said pinchers comprises:
   a pressure plate coupled on a first side to said corresponding first multiplexer tube while said first multiplexer tube is not selected and coupled on a second side to a spring mechanism, said spring mechanism coupled to said housing; and
   a rocker arm coupled to said pressure plate and to said housing.

32. The liquid chemical dispensing system according to claim 30 wherein said pinchers are circumferentially disposed about said flow enabler, said flow enabler comprising:
   a base capable of rotation;
   a pawl arm coupled to said base, said pawl arm comprising a first pawl and a second pawl disposed at opposite ends of said pawl arm respectively.

33. The liquid chemical dispensing system according to claim 30 wherein each of said pinchers comprises:
   a pressure plate coupled to said corresponding first multiplexer tube; and
   a spring arm coupled to said housing, said spring mechanism pinching said corresponding first multiplexer tube against said pressure plate.

34. The liquid chemical dispensing system according to claim 30 wherein said pinchers are linearly disposed along said flow enabler, said flow enabler comprising:
   a lead screw;
   a plurality of valve actuators, each coupled to a corresponding spring arm;
   a cam coupled to said lead screw, said cam being movable to engage one of said plurality of valve actuators and open said corresponding first multiplexer tube.

35. The liquid chemical dispensing system according to claim 14 wherein said input multiplexer comprises:
   a plurality of two-way input valves, each two-way input valve coupled to a corresponding system input tube; and
   a plurality of two-way input-valve output tubes, each two-way input-valve output tube coupled to a corresponding two-way input valve and an input-multiplexer output tube.

36. The liquid chemical dispensing system according to claim 35 wherein said input-multiplexer output tube is coupled to said first transport means.

37. The liquid chemical dispensing system according to claim 36 wherein said plurality of three-way input valves comprises a first three-way input valve coupled to said first transport means.

38. The liquid chemical dispensing system according to claim 36 wherein said plurality of three-way input valves comprises a second three-way input valve coupled to a drain.

39. A liquid dispensing system having a reservoir of chemicals and a supply of water, said system comprising:
   a first fluid transport means adapted to create a flow of said chemicals;
   a system input tube;
   an input valve in fluid communication with both said first fluid transport means and said system input tube, with a portion of said input tube adapted to be collapsible and said input valve having a valve element including a pincher positioned proximate to said collapsible end portion, said pincher being resiliently biased to apply a spring force against said collapsible end to selectively pinch-off fluid flow therethrough, with a flow enabler operably coupled to said pincher to selectively reduce said spring force and allow fluid flow through said collapsible end; and
   a mixing apparatus coupled to both said water supply and said first fluid transport means, said mixing apparatus being adapted to create a flow of said water and mix said flow of water with said flow of chemicals, defining a dilute chemical flow.

40. The liquid dispensing system according to claim 39 further including a solution conductivity cell for measuring a conductivity of said dilute chemical flow.

41. The liquid chemical dispensing system according to claim 39 further including a water conductivity cell for measuring a conductivity of said flow of water.

42. The liquid chemical dispensing system according to claim 39 further comprising a temperature cell for measuring a temperature of said dilute chemical flow.

43. The liquid chemical dispensing system according to claim 39 wherein said input valve includes a housing and said pincher includes a pressure plate coupled on a first side to said corresponding collapsible end to selectively block fluid flow therethrough, with said pressure plate being coupled on a second side to a spring mechanism, said spring mechanism being coupled to said housing and a rocker arm coupled to said pressure plate and to said housing.

44. The liquid chemical dispensing system according to claim 39 further including a plurality of system input tubes each of which has a collapsible end and a pincher associated therewith, wherein the pinchers associated with said plurality of system input tubes are linearly disposed along said flow enabler, with said flow enabler including a lead screw; a plurality of valve actuators, each coupled to a corresponding spring arm, and a cam coupled to said lead screw, said cam being movable to engage one of said plurality of valve actuators to selectively compress and decompress one of said plurality of input tubes.

45. The liquid chemical dispensing system according to claim 39 further comprising an output multiplexer and a plurality of system output tubes, with said output multiplexer placing said system output tubes and said mixing apparatus in fluid communication.

46. The liquid chemical dispensing system according to claim 39 wherein said input valve includes a plurality of two-way input valves, each of which is coupled to a corresponding system input tube, and a plurality of two-way input-valve output tubes, each which is coupled to a corresponding two-way input valve and an input-multiplexer output tube.

47. The liquid chemical dispensing system according to claim 39 further including a plurality of system input tubes each of which has a collapsible end and a pincher associated therewith, wherein the pinchers associated with said plurality of system input tubes are circumferentially disposed about said flow enabler.

48. The liquid chemical dispensing system according to claim 47 wherein each of said pinchers includes a pressure plate coupled to said corresponding first multiplexer tube; and a spring arm coupled to said housing, said spring mechanism pinching said corresponding first multiplexer tube against said pressure plate.

* * * * *